United States Patent [19]

Barnett et al.

[11] Patent Number: 4,642,240
[45] Date of Patent: Feb. 10, 1987

[54] FOODSTUFFS CONTAINING 3-AMINOBENZESULFONIC ACID AS A SWEETENER INHIBITOR

[75] Inventors: Ronald E. Barnett; Ronald G. Yarger, both of Suffern, N.Y.

[73] Assignee: General Foods Corporation, White Plains, N.Y.

[21] Appl. No.: 715,792

[22] Filed: Mar. 25, 1985

Related U.S. Application Data

[63] Continuation of Ser. No. 430,541, Sep. 30, 1982, abandoned, which is a continuation-in-part of Ser. No. 274,035, Jun. 15, 1981, abandoned.

[51] Int. Cl.$^4$ .................. A23L 1/226; A23L 1/236
[52] U.S. Cl. .................. 426/538; 426/535; 426/536; 426/537; 426/548
[58] Field of Search ............... 426/548, 535, 536, 537, 426/538

[56] References Cited

U.S. PATENT DOCUMENTS 3,876,816  4/1975  Zaffaroni ...................... 426/548

OTHER PUBLICATIONS

Boudreau, Food Taste Chemistry 1979, ACS Symposium Series 115, ACS: Wash., D.C., pp. 93, 94, 113–117.
Hawley, The Condensed Chemical Dictionary, 10th Ed., 1981, Van Nostrand Reinhold Co.: New York, p. 661.

*Primary Examiner*—Joseph Golian
*Attorney, Agent, or Firm*—Linn I. Grim; Thomas A. Marcoux; Daniel J. Donovan

[57] ABSTRACT

Food acceptable sweetness modifying compounds comprising certain aromatic amino acids and foodstuff compositions containing the same.

6 Claims, No Drawings

FOODSTUFFS CONTAINING 3-AMINOBENZESULFONIC ACID AS A SWEETENER INHIBITOR

CROSS-REFERENCE TO RELATED APPLICATIONS

This application is a continuation of application Ser. No. 430,541 filed Sept. 30, 1982 which was a continuation-in-part of application Ser. No. 274,035 filed June 15, 1981, the entire contents of which prior applications are incorporated by reference here, both of said applications Ser. Nos. 430,541 and 274,035 being now abandoned.

BACKGROUND OF THE INVENTION

This invention relates generally to sweetness modification and more particularly to low-caloric compounds, particularly well suited as sweetness modifiers in edible foodstuffs.

Sweetness is one of the primary taste cravings of both animals and humans. Thus, the utilization of sweetening agents in foods in order to satisfy this sensory desire is well established.

Naturally occurring carbohydrate sweeteners, such as sucrose, are still the most widely used sweetening agents. While these naturally occurring carbohydrates, i.e. sugars, generally fulfill the requirements of sweet taste, the abundant usage thereof does not occur without deleterious consequences, e.g. high caloric input, dental decay and nutritional imbalance. In fact, often times the level of these sweeteners required to satisfy taste in foodstuffs is far higher than that level of sweetener which is desired for economic, dietetic or other functional considerations.

In an attempt to eliminate the disadvantages concomitant with natural sweeteners, considerable research and expense have been devoted to the production of artificial sweeteners, such as for example, saccharin, cyclamate, dihydrochalcone, aspartame, etc. While some of these artificial sweeteners satisfy the requirements of sweet taste without caloric input and have met with considerable commercial success, they are not, however, without their own inherent disadvantages. For example, many of these artificial sweeteners have the disadvantages of high cost of production, as well as delay in perception of the sweet taste, persistent lingering of the sweet taste, and very objectionable bitter, metallic after-taste when used in food products.

Since it is believed that many of the disadvantages of artificial sweeteners, particularly after-taste is a function of the concentration of the sweetener, it has been previously suggested, that these effects could be reduced or eliminated by combining artificial sweeteners, such as saccharin, with other ingredients or natural sugars, such as pectin, sorbitol, dextrose, maltone, etc. These combined products, however, have not been entirely satisfactory either. Some U.S. patents which disclose sweetener mixtures include, for example, U.S. Pat. No. 4,228,198, U.S. Pat. No. 4,158,068, U.S. Pat. No. 4,154,862, U.S. Pat. No. 3,717,477.

More particularly, U.S. Pat. No. 4,228,198 discloses a sweetening composition comprised of a protein sweetener, saccharin or cyclamate in combination with a sweetness modifier, namely arabinogalactan. The patentee states that the arabinogalactan enhances the overall sweetness of the composition and reduces or eliminates the after taste.

U.S. Pat. No. 4,158,068 discloses a sweetener mixture having an improved saccharose-like taste consisting of acetosulfame and at least one sweetener from the group of aspartyl peptide esters, the sulfamate sweeteners, the sulfimide sweeteners and dihydrochalcone sweeteners.

Mixtures of artificial sweeteners, such as saccharin and the like, and neodiosmin are disclosed, in U.S. Pat. No. 4,154,862, to be of reduced bitterness and after taste.

U.S. Pat. No. 3,717,477 discloses that the sweetening potency and taste of sodium saccharin are improved by the addition of small amounts of optically active D-tryptophan.

The use of sweetening agents in foods to provide functions other than sweetening, such as to act as fillers, bulking agents, antimicrobial agents, freezing point depressants, stabilizers, etc. is also well established. For example, U.S. Pat. No. 3,597,236 discloses a composition, useful for preserving the color of meat, comprising ascorbic acid and a compound selected from the group consisting of para-aminobenzoic acid, m-aminobenzoic acid, isonicotinic acid and N-ethylnicotinamide, wherein dextrose is optionally employed as a carrier to provide a more uniform distribution of the preserving composition in and on the meat. Moreover, while J. Prakt Chemie, Vol. 36, pp. 93–107(1847) and Moncrieff, *The Chemical Senses*, pp. 252–253(1944) disclose m-aminobenzoic acid to be sweet, the literature does not disclose or remotely suggest that this compound would be an excellent foodstuff sweetener, particularly when employed in combination with sweetening amounts of known natural and/or artificial sweeteners.

U.S. Pat. No. 2,752,332 and U.S. Pat. No. 2,709,657 disclose 2-amino-3-hydroxy-benzoic acid or its esters as antioxidants and/or stabilizing agents for certain vegetables. Other U.S. patents including U.S. Pat. No. 3,876,814, U.S. Pat. No. 3,952,058, U.S. Pat. No. 3,845,225 and U.S. Pat. No. 3,876,816 disclose certain aromatic amino compounds as sweeteners. That is, U.S. Pat. Nos. 3,876,814 and 3,952,058 disclose 3-amino-4-n-propylbenzyl alcohol as a non-nutritive sweetener for foods and beverages. U.S. Pat. No. 3,845,225 discloses compounds of the formula

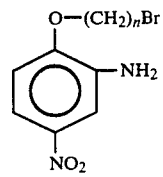

as sweetening agents for foodstuffs, while U.S. Pat. No. 3,876,816 discloses inter alia, 2-amino-4-nitrobenzoic acid as a sweetener.

Furthermore, many times the amount of sweetening agent employed for these alternate functions provides an excessively sweet taste, thereby requiring a modification of the formulation to reduce the sweetener level with a concurrent reduction in providing the alternate function to the food product. One unsuccessful solution of the art was to add bitter or acidic ingredients to the food to reduce the sweetness perception; however, the resultant food then had an undesirable bitter or acidic taste.

Accordingly, in view of the aforementioned disadvantages associated with the use of known sweeteners, i.e., naturally occurring, artificial or combinations thereof, it becomes readily apparent that it would be highly desirable to (a) provide a sweetness modifying agent which when added to foodstuffs can greatly reduce the level of deleterious sweetener normally required and concomitantly eliminate or greatly diminish the numerous disadvantages associated with prior art sweeteners or (b) provide sweetness inhibiting agents which are non-caloric, which do not result in off-tastes and which when added to foodstuffs reduce the level of sweetness perceived without a concurrent reduction in the desirable properties of the foodstuff.

SUMMARY OF THE INVENTION

Accordingly, it is one object of the present invention to provide novel foodstuff compositions containing a sweetness modifying agent.

Another object of this invention is to provide foodstuff compositions containing a low-caloric sweetness modifying agent.

Still another object of the present invention is to provide novel sweetness inhibiting compounds.

A further object of this invention is to provide foodstuff compositions containing a sweetness inhibiting agent.

A still further object of the present invention is to provide sweetness inhibiting agents, which when added to foodstuffs, greatly reduce or eliminate unwanted or unpleasant sweet tastes, thus increasing the palatability of overly sweet products.

Another object of this invention is to provide foodstuff compositions containing sweetness modifying agents which inhibit the sweetness perception of the foodstuff, without adding any off-tastes such as bitterness, acidity, etc. to the foodstuff.

Still another object of this invention is to provide foodstuff compositions containing a sweetness modifying agent which will increase the sweetness perception of the foodstuff.

A further object of this invention is to provide a process for inhibiting the sweetness perception of a foodstuff.

Another object of the present invention is to provide novel compounds which are useful in foodstuffs as sweetness modifying agents (inhibitors or sweeteners).

These and other objects are accomplished herein by providing food-acceptable sweetness modifying compounds, i.e. sweeteners or sweetness inhibitors, which when added to a foodstuff and depending upon the particular compound employed, increases or inhibits the sweet taste perceived from the foodstuff, said food acceptable sweetness modifying compounds having the general formula:

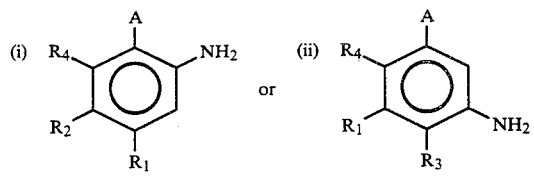

wherein:

A is an acid group of the structure $-ZO_qH_r$ or salt thereof wherein Z is an element selected from the group consisting of carbon, sulfur, boron and phosphorus, q is an integer from 2 to 3 and r is an integer from 1 to 3;

$R_1$ is selected from the group consisting of $R_2$, $-x-y-R_5$,

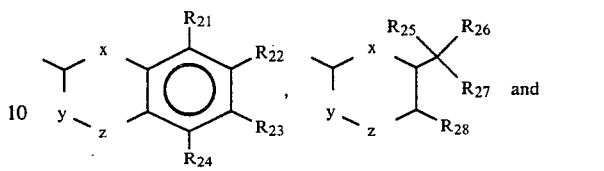

wherein p is an integer from 0 to 1; x, y and z are selected from the group consisting of $CH_2$, $(CH_2)_2$, NH, S, O and C=O with the proviso that when x and y are directly bonded to each other x is the same as y only when x and y are $CH_2$ or S and with the proviso that when y and z are directly bonded to each other y is the same as z only when y and z are $CH_2$ or S; v and w are selected from the group consisting of $CH_2$, S, O, SO, $SO_2$ and C=O, with the proviso that v and w are the same only when v and w are $CH_2$; $R_{21}$ is selected from the group consisting of H, alkyl having from 1 to 3 carbon atoms, cyclopropyl, OH, $OCH_3$, $NH_2$, CHO, COOH, $COOCH_3$, $COCH_3$, $SO_3H$, $SOCH_3$, $SO_2CH_3$, $SO_2NH_2$, F, Cl, Br, and $CF_3$; $R_{22}$ is selected from the group consisting of H, $CH_3$, $C_2H_5$, OH, $OCH_3$, $NH_2$, CHO, COOH, $SO_3H$, $SO_2NH_2$, F, Cl, Br and $CF_3$; $R_{23}$ is selected from the group consisting of H, $CH_3$, OH, $NH_2$, $SO_3H$, $SO_2NH_2$, F, Cl and $CF_3$; $R_{24}$ is the same as defined for $R_{22}$; $R_{25}$–$R_{30}$ are each selected from the group consisting of H, alkyl having from 1 to 3 carbon atoms and cyclopropyl; and $R_5$ is selected from the group consisting of phenyl, phenyl having ortho, meta or para substituents, said substituents selected from the group consisting of $R_{21}$, $R_{22}$ and $R_{23}$, respectively, a 5-membered heteroaromatic ring, a 6-membered heteroaromatic ring, a 5-membered heteroaromatic ring having ortho or meta substituents, said substituents selected from the group consisting of $R_{21}$ and $R_{22}$ respectively, and a 6-membered heteroaromatic ring having ortho, meta or para substituents, said substituents selected from the group consisting of $R_{21}$, $R_{22}$ and $R_{23}$ respectively,

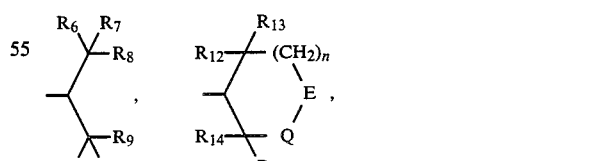

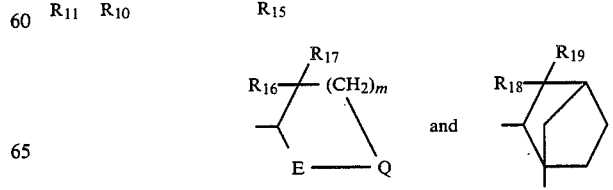

wherein $R_6$–$R_{20}$ are each selected from the group consisting of H, alkyl having from 1 to 3 carbon atoms and cyclopropyl, wherein E and Q are selected from the group consisting of $CH_2$, NH, S, O, SO, and $SO_2$ and C=O with the proviso that E and Q can be the same only when E and Q are $CH_2$ or S, m is an integer from 1 to 2 and n is an integer from 0 to 1;

$R_2$ is selected from the group consisting of $R_1$, H, alkyl from 1 to 3 carbons, cyclopropyl, OH, $OCH_3$, $OCH_2CH_3$, $CH_2OCH_3$, $CH_2CH_2OH$, $CH(CH_3)CH_2OH$, CHO, $COCH_3$, $CH_2CHO$, COOH, $CH_2COOH$, $COOCH_3$, $OCOCH_3$, $CONH_2$, NHCHO, F, Cl, Br, I, $CF_3$, $SCH_3$, $SCH_2CH_3$ $CH_2SCH_3$, $SO_3H$, $SO_2NH_2$, $SO_2CH_3$, $SOCH_3$, $CH_2SO_3H$ and $CH_2SONH_2$;

$R_3$ is selected from the group consisting of H, F, Cl, Br, I, $CF_3$, OH, linear alkoxy wherein the number of oxygens plus the number of carbons is five or less, $NH_2$, NH—$R_{31}$ wherein $R_{31}$ is linear alkyl having from 1 to 4 carbon atoms, linear thioalkyl free from SH groups wherein the number of sulfur atoms plus the number of carbon atoms is less than or equal to five, linear alkenyl having from 2 to 5 carbon atoms and linear alkyl having from 1 to 5 carbon atoms;

$R_4$ is selected from the group consisting of H, alkyl from 1 to 3 carbons, cyclopropyl, OH, $OCH_3$, $OCH_2CH_3$, $CH_2OCH_3$, $CH_2CH_2OH$, $CH(CH_3)CH_2OH$, CHO, $COCH_3$, $CH_2CHO$, $CH_2COOH$, $COOCH_3$, $OCOCH_3$, $CONH_2$, NHCHO, F, Cl, Br, I, $CF_3$, $SCH_3$, $SCH_2CH_3$, $CH_2SCH_3$, $SO_2NH_2$, $SO_2CH_3$, $SOCH_3$, $CH_2SO_3H$ and $CH_2SONH_2$; and wherein in structure (i) adjacent substituents $R_1$ and $R_2$, and $R_2$ and $R_4$, when taken together with the carbon atoms to which they are attached, may form a ring selected from the group consisting of aryl, cycloalkyl, cyloalkenyl and heterocyclic; and wherein in structure (ii) adjacent substituents $R_1$ and $R_4$, and $R_1$ and $R_3$, when taken together with the carbon atoms to which they are attached may form a ring selected from the group consisting of aryl, cycloalkyl, cycloalkenyl and heterocyclic; and with the proviso that in structure (i) when A is COOH, $R_1$, $R_2$ and $R_4$ are not all hydrogen and in structure (ii) when A is COOH, $R_1$, $R_3$ and $R_4$ are not all hydrogen.

DETAILED DESCRIPTION OF THE INVENTION

In accordance with the present invention, it has been surprisingly discovered that the sweet taste perceived in a food product can be greatly modified, i.e. sweetened or inhibited, by the addition to the food product of a compound within certain classes of compounds described in more detail hereinafter.

Thus, according to the present invention it has been unexpectedly found that certain compounds, described in more detail hereinafter, are effective sweetness modifiers with any of a number of known natural and/or artificial sweeteners including, for example, sucrose, fructose, corn syrup solids, dextrose, xylitol, sorbitol, mannitol, acesulfam, thaumatin, invert sugar, saccharin, cyclamate, dihydrochalcone, aspartame (L-aspartyl-L-phenylalanine methyl ester) and other dipeptides, glycyrrhizin, stevioside and the like.

Typical products in which the sweetness modifiers of the present invention may be used are foodstuffs, for example, beverages, including soft drinks, carbonated beverages, ready to mix beverages and the like, infused foods (e.g. fruits or vegetables), sauces, condiments, salad dressings, juices, syrups, desserts, including puddings, gelatin and frozen desserts, like ice creams, sherbets and icings, confections, chewing gum and intermediate moisture foods (e.g. dog foods); and pharmaceutical preparations such as toothpaste and mouthwashes; and the like.

More specifically the sweetness modifying agents of this invention have the general formula:

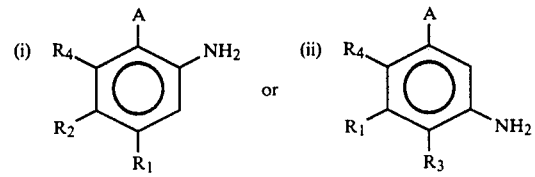

wherein:

A is an acid group of the structure —$ZO_qH_r$ or salt thereof wherein Z is an element selected from the group consisting of carbon, sulfur, boron and phosphorus, q is an integer from 2 to 3 and r is an integer from 1 to 3;

$R_1$ is selected from the group consisting of $R_2$, —x—y—$R_5$,

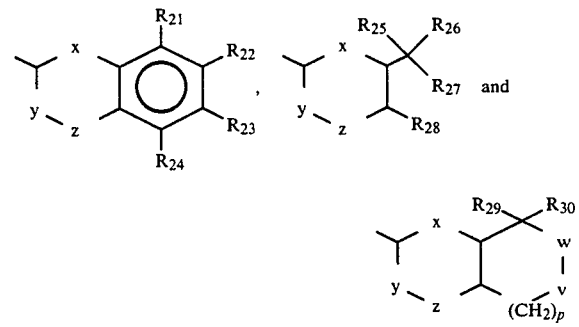

wherein p is an integer from 0 to 1; x, y and z are selected from the group consisting of $CH_2$, $(CH_2)_2$, NH, S, O and C=O with the proviso that when x and y are directly bonded to each other x is the same as y only when x and y are $CH_2$ or S and with the proviso that when y and z are directly bonded to each other y is the same as z only when y and z are $CH_2$ or S; v and w are selected from the group consisting of $CH_2$, S, O, SO, $SO_2$ and C=O, with the proviso that v and w are the same only when v and w are $CH_2$; $R_{21}$ is selected from the group consisting of H, alkyl having from 1 to 3 carbon atoms, cyclopropyl, OH, $OCH_3$, $NH_2$, CHO, COOH, $COOCH_3$, $COCH_3$, $SO_3H$, $SOCH_3$, $SO_2CH_3$, $SO_2NH_2$, F, Cl, Br, and $CF_3$; $R_{22}$ is selected from the group consisting of H, $CH_3$, $C_2H_5$, OH, $OCH_3$, $NH_2$, CHO, COOH, $SO_3H$, $SO_2NH_2$, F, Cl, Br and $CF_3$; $R_{23}$ is selected from the group consisting of H, $CH_3$, OH, $NH_2$, $SO_3H$, $SO_2NH_2$, F, Cl and $CF_3$; $R_{24}$ is the same as defined for $R_{22}$; $R_{25}$–$R_{30}$ are each selected from the group consisting of H, alkyl having from 1 to 3 carbon atoms and cyclopropyl; and $R_5$ is selected from the group consisting of phenyl, phenyl having ortho, meta or para substituents, said substituents selected from the group consisting of $R_{21}$, $R_{22}$ and $R_{23}$, respectively, a 5-membered heteroaromatic ring, a 6-membered heteroaromatic ring, a 5-membered heteroaromatic ring having ortho, or meta substituents, said substituents selected from the group consisting of $R_{21}$ and $R_{22}$ respectively, and a 6-membered heteroaromatic ring having ortho, meta or para substituents, said substituents selected from the group consisting of $R_{21}$, $R_{22}$ and $R_{23}$ respectively,

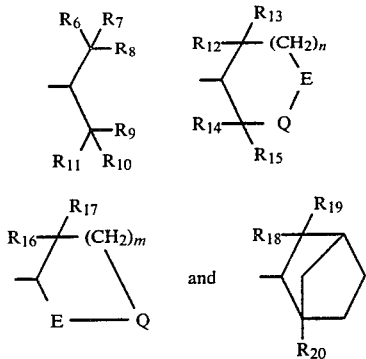

wherein $R_6$–$R_{20}$ are each selected from the group consisting of H, alkyl having from 1 to 3 carbon atoms and cyclopropyl, wherein E and Q are selected from the group consisting of $CH_2$, NH, S, O, SO, $SO_2$ and C=O with the proviso that E and Q can be the same only when E and Q are $CH_2$ or S, m is an integer from 1 to 2 and n is an integer from 0 to 1;

$R_2$ is selected from the group consisting of $R_1$, H, alkyl from 1 to 3 carbons, cyclopropyl, OH, $OCH_3$, $OCH_2CH_3$, $CH_2OCH_3$, $CH_2CH_2OH$, $CH(CH_3)CH_2OH$, CHO, $COCH_3$, $CH_2CHO$, COOH, $CH_2COOH$, $COOCH_3$, $OCOCH_3$, $CONH_2$, NHCHO, F, Cl, Br, I, $CF_3$, $SCH_3$, $SCH_2CH_3$, $CH_2SCH_3$, $SO_3H$, $SO_2NH_2$, $SO_2CH_3$, $SOCH_3$, $CH_2SO_3H$ and $CH_2SONH_2$;

$R_3$ is selected from the group consisting of H, F, Cl, Br, I, $CF_3$, OH, linear alkoxy wherein the number of oxygens plus the number of carbons is five or less, $NH_2$, NH—$R_{31}$ wherein $R_{31}$ is linear alkyl having from 1 to 4 carbon atoms, linear thioalkyl free from SH groups wherein the number of sulfur atoms plus the number of carbon atoms is less than or equal to five, linear alkenyl having from 2 to 5 carbon atoms and linear alkyl having from 1 to 5 carbon atoms;

$R_4$ is selected from the group consisting of H, alkyl from 1 to 3 carbons, cyclopropyl, OH, $OCH_3$, $OCH_2CH_3$, $CH_2OCH_3$, $CH_2CH_2OH$, $CH(CH_3)CH_2OH$, CHO, $COCH_3$, $CH_2CHO$, $CH_2COOH$, $COOCH_3$, $OCOCH_3$, $CONH_2$, NHCHO, F, Cl, Br, I, $CF_3$, $SCH_3$, $SCH_2CH_3$, $CH_2SCH_3$, $SO_2NH_2$, $SO_2CH_3$, $SOCH_3$, $CH_2SO_3H$ and $CH_2SONH_2$; and wherein in structure (i) adjacent substituents $R_1$ and $R_2$, and $R_2$ and $R_4$, when taken together with the carbon atoms to which they are attached, may form a ring selected from the group consisting of aryl, cycloalkyl, cycloalkenyl and heterocyclic; and wherein in structure (ii) adjacent substituents $R_1$ and $R_4$, and $R_1$ and $R_3$, when taken together with the carbon atoms to which they are attached may form a ring selected from the group consisting of aryl, cycloalkyl, cycloalkenyl and heterocyclic; and with the proviso that in structure (i) when A is COOH, $R_1$, $R_2$ and $R_4$ are not all hydrogen and in structure (ii) when A is COOH, $R_1$, $R_3$ and $R_4$ are not all hydrogen.

The A group of the above general structures (i) and (ii) is a Bronsted acid group or non-toxic salt thereof.

Appropriate examples of acidic groups or salts thereof include carboxylic acid and salts thereof, sulfonic acid and salts thereof; sulfinic acid and salts thereof; phosphonic acid and salts thereof; phosphinic acid and salts thereof; boronic acid or salts thereof and the like. Appropriate examples of salts of the acidic groups include non-toxic salts such as sodium, potassium, ammonium, calcium or magnesium salts of the above acids.

Illustrative compounds with the above general formulas (i) and (ii) include
2-aminobenzenesulfonic acid;
2-amino-4-chlorobenzensulfonic acid;
2-amino-4-chlorobenzeneboronic acid;
2-amino-4-chlorobenzenephosphonic acid;
2-amino-5-bromobenzenesulfonic acid;
2-amino-6-iodobenzenesulfonic acid;
3-aminobenzenesulfonic acid;
3-aminobenzenephosphonic acid;
3-aminobenzeneboronic acid;
2-amino-4-methylbenzenesulfonic acid;
2-amino-4-methylbenzeneboronic acid;
2-amino-4-butylbenzenephosphonic acid;
2-amino-5-isobutylbenzenesulfonic acid;
2-amino-6-ethylbenzenesulfonic acid;
3,4-diaminobenzenesulfonic acid;
3,5-diaminobenzenesulfonic acid;
3,6-diaminobenzenesulfonic acid;
2-amino-4-carboxybenzenesulfonic acid;
2-amino-5-carboxybenzenesulfonic acid;
2-amino-6-carboxybenzenesulfonic acid;
3-amino-4-carboxybenzenesulfonic acid;
3-amino-5-carboxybenzenesulfonic acid;
3-amino-6-carboxybenzenesulfonic acid;
3-amino-4-chlorobenzoic acid;
3-amino-5-iodobenzoic acid;
5-amino-2-bromobenzoic acid;
3-amino-4-methylbenzoic acid;
3-amino-5-ethylbenzoic acid;
5-amino-2-isopropylbenzoic acid;
3-amino-4-isobutoxybenzoic acid;
3-amino-5-isopropoxybenzoic acid;
5-amino-2-methoxybenzoic acid;
3-amino-4-hydroxybenzoic acid;
3-amino-5-hydroxybenzoic acid;
5-amino-2-hydroxybenzoic acid;
3,5-diaminobenzoic acid;
3,4-diaminobenzoic acid;
2,5-diaminobenzoic acid;
2-amino-5-butylbenzoic acid;
2-amino-6-pentylbenzoic acid;
2-amino-4-(2-butoxy)benzoic acid;
2-amino-5-ethoxybenzoic acid;
2-amino-6-propoxybenzoic acid;
2-aminoisophthalic acid;
4-aminoisophthalic acid;
5-aminoisophthalic acid;
3-aminophthalic acid;
4-aminophthalic acid;
2-aminoterephthalic acid;
3-amino-4-chloro-2-methylbenzoic acid;
3-amino-4-chloro-5-butylbenzoic acid;
5-amino-4-iodo-2-isopropylbenzoic acid;
2-amino-4-ethoxybenzenesulfonic acid;
2-amino-5-ethoxybenzenesulfonic acid;
2-amino-5-methoxybenzenephosphonic acid;
2-amino-5-ethoxybenzeneboronic acid;
2-amino-6-methoxybenzenesulfonic acid;

2-amino-4-hydroxybenzenesulfonic acid;
2-amino-5-hydroxybenzenesulfonic acid;
2-amino-6-hydroxybenzenesulfonic acid;
2,3-diaminobenzenesulfonic acid;
2,4-diaminobenzenesulfonic acid;
2,5-diaminobenzenesulfonic acid;
2,6-diaminobenzenesulfonic acid;
3-amino-4-methylbenzenesulfonic acid;
3-amino-5-butylbenzenesulfonic acid;
3-amino-6-propylbenzenesulfonic acid;
3-amino-4-methoxybenzenesulfonic acid;
3-amino-5-ethoxybenzenesulfonic acid;
3-amino-6-propoxybenzenesulfonic acid;
3-amino-4-iodobenzenesulfonic acid;
3-amino-5-chlorobenzenesulfonic acid;
3-amino-6-fluorobenzenesulfonic acid;
3-amino-4-hydroxybenzenesulfonic acid;
3-amino-5-hydroxybenzenesulfonic acid;
3-amino-6-hydroxybenzenesulfonic acid;
3-amino-6-hydroxybenzoic acid;
3-amino-6-chlorobenzoic acid;
3-amino-4-methoxybenzoic acid;
3-amino-5-acetamidobenzoic acid;
2-amino-4-chlorobenzoic acid;
2-amino-5-sulfoxybenzoic acid;
3-amino-4-ethylbenzenesulfonic acid;
3-amino-4-n-butylbenzenesulfonic acid;
3-amino-4-n-pentylbenzenesulfonic acid;
2-amino-5-methylbenzenesulfonic acid;
2-aminobenzenesulfonic acid;
2-amino-4-(4-chlorophenethyl)benzoic acid;
4-N-fenchylmethyl-2,4-diaminobenzoic acid;
2-amino-4,5-diethoxybenzenesulfonic acid;
2-amino-4-(4-methylbenzoyloxy)benzoic acid;
2-amino-4-isopentylbenzenephosphonic acid;
6-acetyl-2-aminobenzeneboronic acid;
2-amino-4-[2,(1,4-benzodioxano)]benzenesulfinic acid;
3-amino-5-(3-methylcyclohexylmethylamino)benzoic acid;
3-amino-4-chlorobenzenesulfonic acid;
3-amino-5-(4-hydroxyphenethyl)benzeneboronic acid;
3-amino-5-(2-methylcyclohexylmethylamino)phosphinic acid; and
3-amino-5-[2-(8,8-dimethyldecalino)]benzoic acid.

Many of the compounds within the above formulas (i) and (ii) are sweetness inhibiting agents while others are sweenteners. Identification of these properties for many of these compounds is found hereinafter.

A preferred sweetness inhibiting agent within the scope of the present invention is 3-aminobenzenesulfonic acid.

Compounds within the above formulas (i) and (ii) which are sweeteners include 2-amino-4-chlorobenzoic acid, 2-amino-5-chlorobenzoic acid, 2-amino-4-methylbenzoic acid, 2-amino-5-methylbenzoic acid and 2-amino-5-iodobenzoic acid.

Moreover, some of the compounds within the formulas (i) and (ii) are novel. These include 3-amino-4-hydroxybenzenesulfonic acid, 3-amino-4-ethylbenzenesulfonic acid, 3-amino-4-n-butylbenzenesulfonic acid, 3-amino-4-n-pentylbenzenesulfonic acid, 3-amino-5-carboxybenzenesulfonic acid, 3-amino-5-(N-cyclohexylmethylamino)benzoic acid, 3-amino-5-benzylaminobenzoic acid, and 3-amino-5-(N-furfurylamino)benzoic acid. These recited novel compounds are sweetness inhibiting agents and specific procedures for the preparation thereof are found hereinafter.

As is readily apparent, depending upon the particular set of substituents, a given compound within the above formulas (i) or (ii) may be a sweetness inhibitor or may be a sweetener. In order to determine whether a compound within the above general formulae is a sweetness inhibitor or is sweet itself, a simple procedure is employed. This procedure involves making a 1% aqueous solution of the selected compound adjusted to pH 7 and a 0.2% aqueous solution of the selected compound adjusted to pH 3. The solutions alone are tasted to determine whether the selected compound is a sweetener. To determine whether the compound is a sweetness inhibitor, solutions made up as above which also contain 5% sucrose are tasted and judged against 5% sucrose alone which has been adjusted to the same pH. If the compound has bitter, salty or sour tastes of its own, the bitter, salty or sour tastes are matched with urea, sodium chloride or citric acid, respectively, and the compound plus 5% sucrose tasted against 5% sucrose containing urea, sodium chloride, or citric acid at a level to match the off-tastes of the compound.

In accordance with the present invention, a sweetness inhibitor is defined to be a compound which, when mixed with a sweetener, reduces or eliminates the perceived sweetness without substantially contributing to the bitter, salty or sour taste of the foodstuff product. If a compound has a bitter, salty or sour taste of its own, it must be shown that the bitter, salty or sour taste is not sufficient to account for the substantial loss in sweetness perception.

Thus, one significant aspect of the present invention is that the inhibiting of the sweet taste of a food product by the sweetness inhibitors of the present invention is not due to the taste of the compound itself, but rather is due to an unexpected and highly surprising effect which results when the sweetness inhibitor is combined with a sweetener in the food product and tasted by the consumer. 3-Aminobenzenesulfonic acid is a preferred sweetness inhibiting agent within the scope of the present invention. For example, 3-aminobenzenesulfonic acid is found to inhibit the sweetness perception of a sweetener is a foodstuff as much as 100%.

Accordingly, what is readily apparent from the discovery herein is that the utilization of even very small quantities of the inhibiting modifiers described herein can reduce or even eliminate the undesirable sweet and/or lingering after tastes of certain sweeteners in food products containing natural and/or artificial sweeteners, without affecting the other desirable tastes and properties of the food.

In order to achieve the surprising modifying results of the present invention, the modifying compounds described herein are generally added to the food product at a level which is effective to inhibit the sweetness perception of the food product or potentiate the sweetness of the food product. More particularly, it has been found that the astonishing results provided by the present invention occur when the sweetener or inhibiting agent is added to the food product (containing a sweetener) in an amount in the range of from about 0.001 to 2% by weight based on the weight of the consumed product. Greater amounts are operable but not practical. Preferred amounts are in the range of from about 0.01 to 1% and most preferably 0.1 to 0.5% by weight of the foodstuff.

Generally, the inhibiting or sweetening effect provided by the present compounds is experienced over a wide pH range, e.g. 2 to 10 preferably 3 to 7 and in buffered or unbuffered formulations.

Many of the compounds within the scope of the present invention are known and can be readily synthesized according to conventional synthetic procedures or can be commercially obtained. For example, many of the compounds within formulas (i) and (ii), wherein A is COOH or SO₃H, are commercially available. Notwithstanding, these compounds can be readily prepared, for example, by (a) nitration of benzoic acid followed by reduction, (b) oxidation of substituted nitrotoluenes, (c) sulfonation of nitrobenzenes followed by reduction or sulfonation of aniline or derivatives thereof and (d) nitration of benzenesulfonic acids followed by reduction.

Compounds within formulas (i) and (ii), wherein A is SO₂H can be prepared from a. the corresponding substituted phenylsulfochloride according to Gutmann, Zeitschrift fur Analytische Chemie 65, 251 or Gebauer-Fulnegg, Riesenfeld, Monatscheffe fur Chemie 47, 191, 194 or V. Braun, Kaiser, Berichte, 56, 550 or Beilstein XI, 1st edition, 4;

b. the corresponding substituted phenylmagnesium bromide according to Gilman, Fothergill, JACS, 51 3506;

c. the corresponding substituted thiophenyl or diphenylsulfide according to Lecher, Holschneider, Berichte 57 757;

d. the corresponding substituted benzene sulfonylphenyldisulfide according to Hubacher, Organic Synthesis 15, 1935 or Brooker, Child, Smiles, J. Chemical Society London, 1927, 1386-7;

e. the corresponding substituted benzene sulfonic acid according to (Twist, Smiles, JCS London, 127, 1250).

f. the corresponding substituted diazoaniline according to Kharash, et al., JACS, 43 612; and g. the corresponding substituted benzene sulfonic acid chloride according to Child, Smiles, JCS 1926 2699 or Bere, Smiles, Organic Synthesis, Vol. 1, 2nd edition, 1941, 7.

Compounds wherein A is PO₃H₂ can be prepared from the corresponding nitrophenylhydroxyphosphoazobenzene according to Beilstein XVI, 1st supplement page 427.

Compounds wherein A is PO₂H₂ can be synthesized from the corresponding nitrophenyl phosphine according to Beilstein XVI, 791 or nitrophenyldichlorophosphine as taught by Michaels, Ananow, Berichte 7, 1688 and Michaelis, Annalen, 181, 303.

Compounds wherein A is BO₂H₂ can be prepared as follows:

a. Hydrolysis of the corresponding nitrophenylborodichloride as taught by Michaelis, Behrens, Berichte 27, 248;

b. hydrolysis of the corresponding nitrophenylborodiisobutylate as taught by Khotinsky, Melamed, Berichte 42, 3033.

c. from the nitrophenylborodifluoride as taught by Beilstein XVI, 2nd supplement, 638 or d. nitration of the appropriate substituted benzene boronic acid as taught by Beilstein XVI, 3rd supplement 1276 or JACS 53, 711, 714 or Seaman & Johnson, JACS 53, 711, 716 followed by reduction to the corresponding amino compound.

In the preparation of compounds herein, wherein R₁ is —x—y—R₅, the starting materials are commercially available or can be made by standard methods of electrophilic aromatic substitution. Synthesis of A groups have been described hereinabove. In some cases, it may be necessary to add A later —NO₂ may have to be added later, or —NO₂ may have to be converted to a protected —NH₂ (t-butylcarbobenzoxy is the preferred protecting group. See R. A. Boissonnas, *Adv. Org. Chem.* 3, 171 (1963)). The two major starting materials are

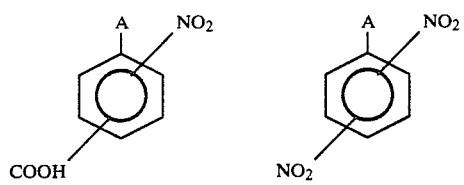

The carboxylic acid is converted to the acid chloride, from which both the ester and the amide are made. For references on procedures, see R. C. Fuson, *Reactions of Organic Compounds* chapters 15, 17, 19, Wiley, New York, 1962. Illustratively, these reactions are

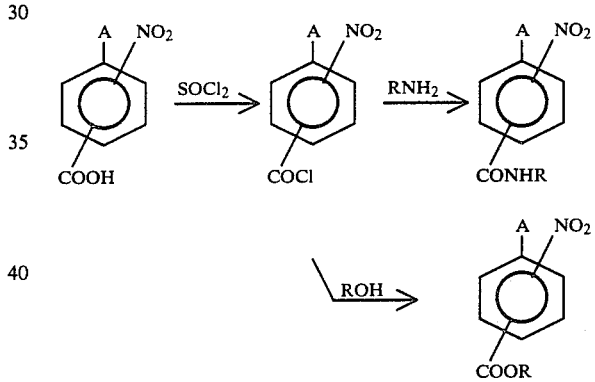

The ester can also be made by the route

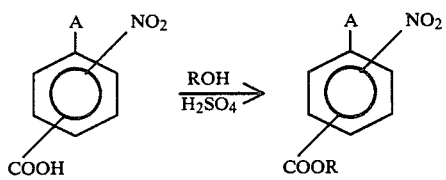

The ester and the amide can be reduced (R. F. Nystrom, S. W. Chaikin, and W. G. Brown, *J. Amer. Chem. Soc.* 71 3245 (1949)).

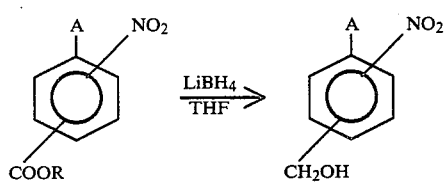

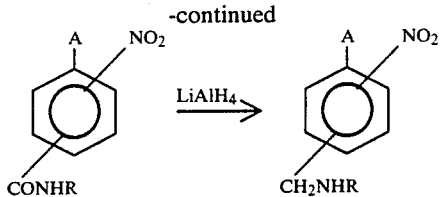

In reduction of the ester, LiBH₄ is preferred over LiAlH₄ because of its greater selectivity.

The benzyl alcohol provides the starting material for several routes to the —x—y— grouping. It can be used directly in a Williamson ether synthesis or converted to the benzyl bromide and used in nucleophilic substitution reactions (R. C. Fuson, *Reactions of Organic Compounds* pp. 271-272, 284-286, 288-289 Wiley, New York, 1962; S. E. Wentworth and P. L. Sciaroffa *Org. Prep. Proc.* 1 225 (1969)).

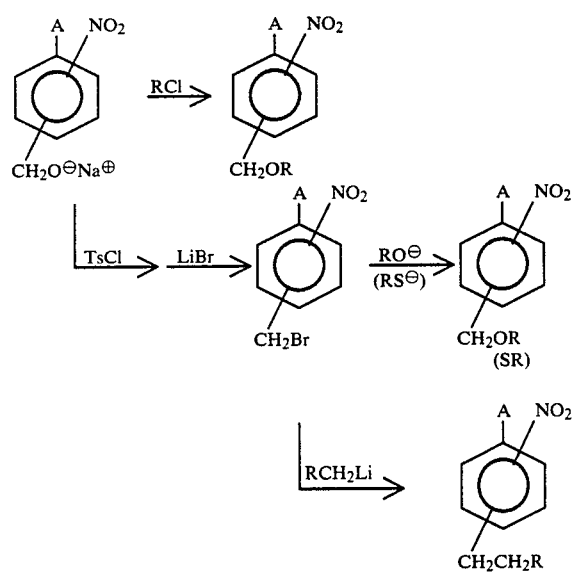

The benzyl alcohol can also be oxidized to the aldehyde which is a starting material for reactions described hereinbelow (E. F. Pratt and J. F. Vand de Contle, *J. Org. Chem.* 26 2973 (1961)).

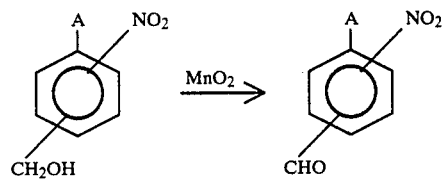

The aldehyde can be reductively aminated. (R. F. Borch. *Org. Syn.* 52 124 (1972)).

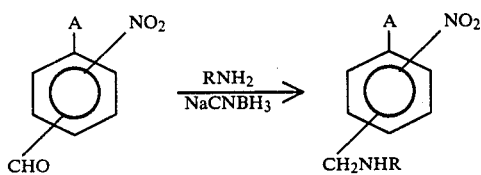

Another useful starting material is the dinitro acid. This can be mono-reduced, acetylated and reduced (W. W. Hartman and H. L. Sillernay, *Org. Syn. Coll.* Vol. 3, 83 (1955)).

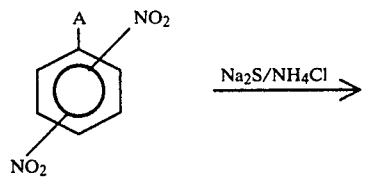

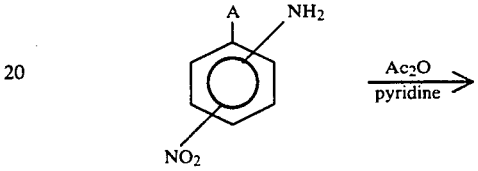

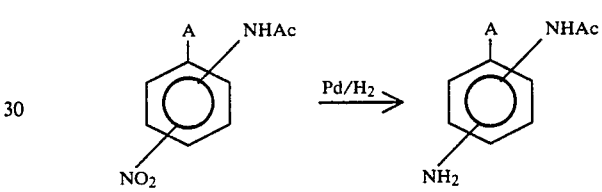

The amine can be alkylated, acylated or diazotized and hydrolyzed (R. F. Borch, *Org. Syn.* 52 124 (1972), *Org. Syn.* III, 453).

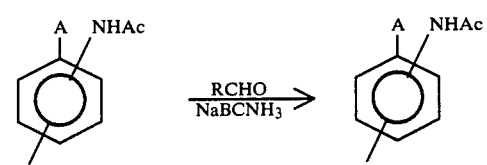

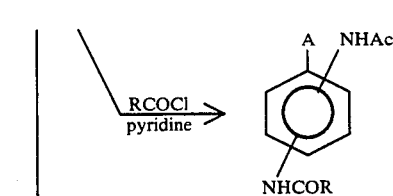

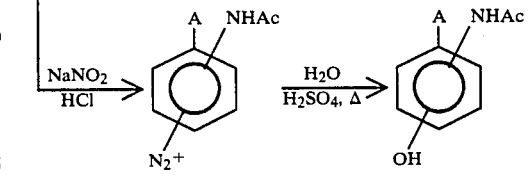

The phenol can be alkylated or acylated.

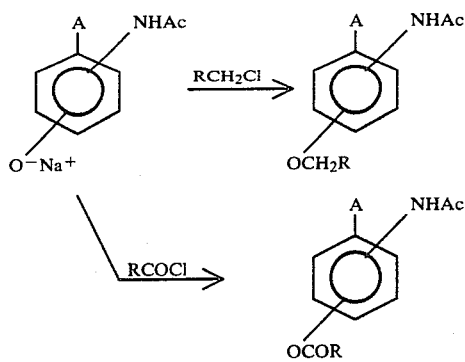

For synthetic routes to the preparation of compounds, wherein $R_1$ is —x—y—$R_5$ and where $R_5$ is phenyl and 6-membered ring heteroaromatic with ortho substituents $R_{21}$, meta substituents $R_{22}$, para substituents $R_{23}$; 5-membered ring heteroaromatic with ortho substituents $R_{21}$ and meta substituents $R_{22}$, aromatic aldehydes, phenols, amines and carboxylic acids are used in conjunction with synthetic routes described above. These aromatics are commercially available or can be made by standard electrophilic aromatic substitution reactions (R. C. Fuson, *Reactions of Organic Compounds*, Ch. 2-8, Wiley, New York, 1962).

For synthetic routes to $R_2$, $R_3$ and $R_4$, many of the desired compounds are commercially available or can be made from commercially available compounds by the routes described above. Otherwise, the starting materials can be made by standard methods of electrophilic aromatic substitution.

For synthetic routes to compounds wherein

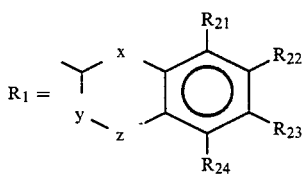

compounds of the structure

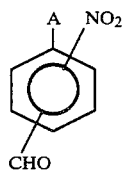

are needed. Their synthesis has been described above. This structure will hereafter be called RCHO, wherein R is

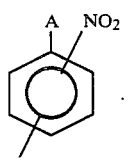

The following examples are for $R_{21}$–$R_{24}$ equal to H, but analogous chemistry would apply for other substituents. The starting materials are commercially available or can be made by standard methods of electrophilic aromatic substitution (R. C. Fuson, *Reactions of Organic Compounds*, Ch. 2-8, Wiley, New York, 1962).

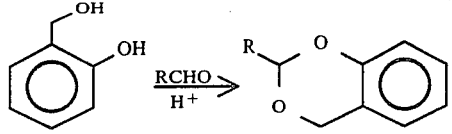

(W. E. Dick and J. E. Hodge, *J. Agric. Food Chem.*, 26, 723–725 (1978)). Analogously, the following compounds can be made (G. M. Badger, The Chemistry of Heterocyclic Compounds, pp. 133, 191, 199, 207, 381, Academic Press, New York, 1961; R. C. Fuson, Reactions of Organic Compounds, Ch. 17, Wiley, New York, 1962).

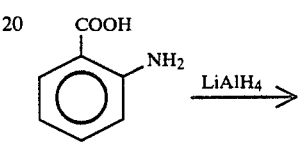

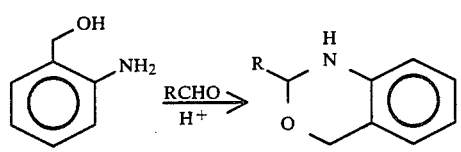

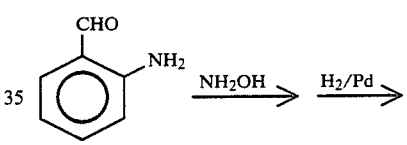

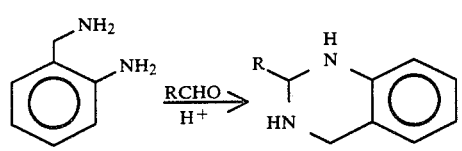

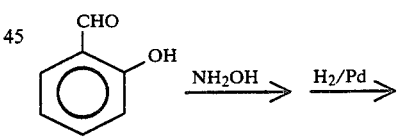

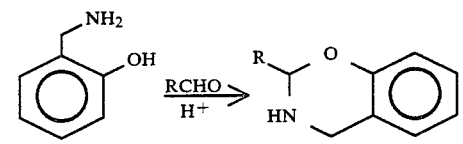

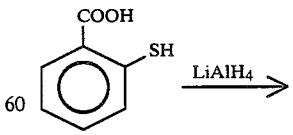

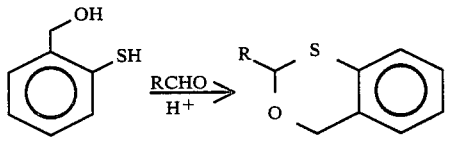

Similarly, the following acyl adducts can be synthesized (M. Yamato, K. Hashigaki, E. Honda, K. Sato and T. Koyania, *Chem. Pharm. Bull.*, (Tokyo) 25, 695 (1977)).

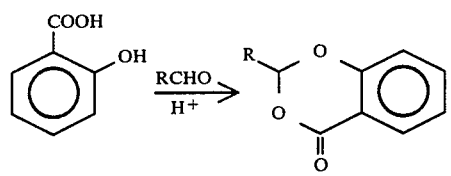

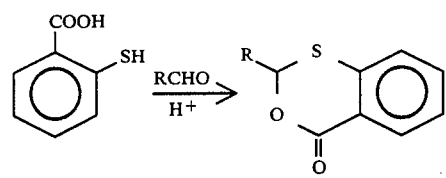

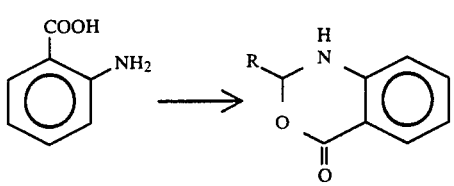

Flavonones and their analogs can also be readily synthesized (M. Yamato, K. Hashigaki, K. Mito and T. Koyama, *Chem. Pharm. Bull.* (Tokyo) 26 2321–2327 (1978)). Ketone reduction can be carried out by any of a number of methods: Clemmensen (*Organic Reactions* 1, 155), Wolff-Kishner (Organic Reactions 4, 378), Tosylhydrazine and sodium borohydride (*Chem. Ind.* 153, 1689 (1964)).

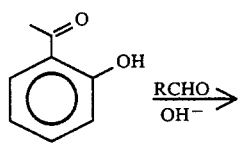

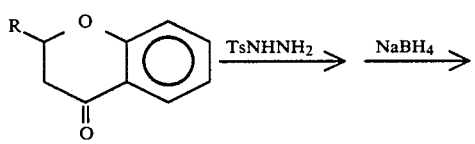

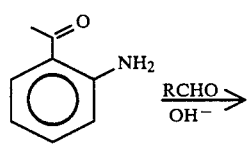

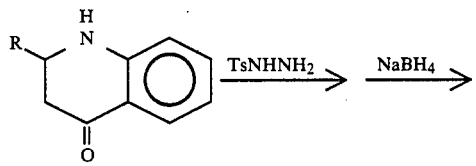

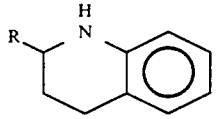

Additional synthetic routes are provided by reactions with the α-chloroalcohols which are obtained from

(*Organic Syntheses III*, 119; A.L.P. Coll., *Chem. Abstracts* 45, 7981 (1951)):

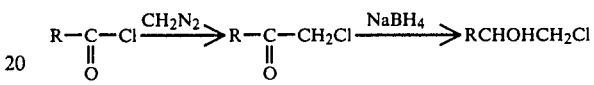

The cyclization reactions follow standard aliphatic nucleophilic substitution chemistry (R. C. Fuson, *Reactions of Organic Compounds*, pp. 271–272, 284–286, 288–289, Wiley, New York, 1962).

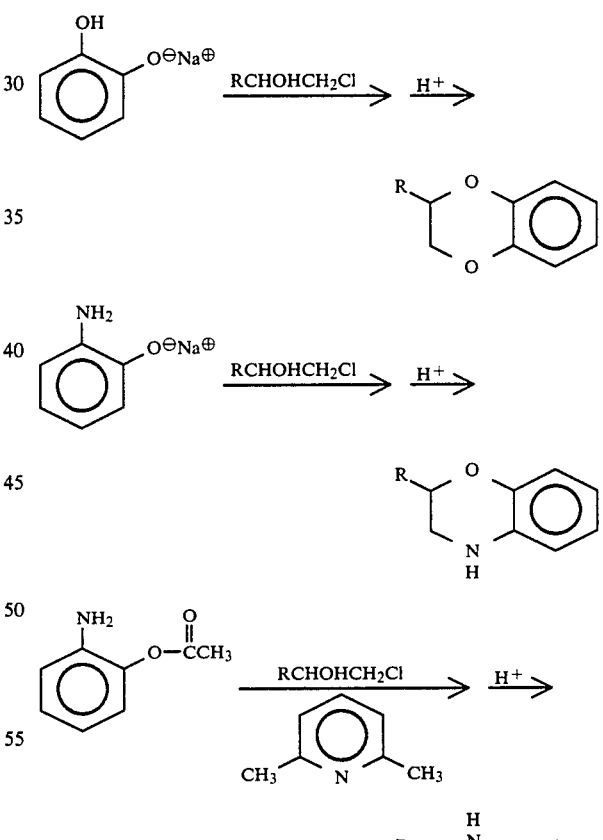

-continued

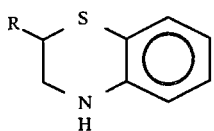

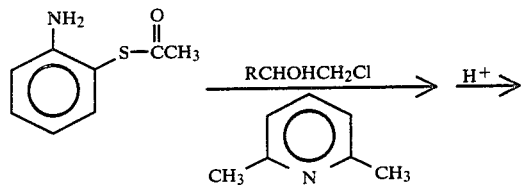

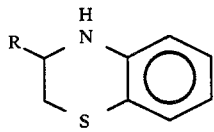

An intramolecular Friedel-Crafts alkylation provides two more classes of desired compounds (R. C. Fuson, *Reactions of Organic Compounds*, Ch. 8, Wiley, New York, 1962)

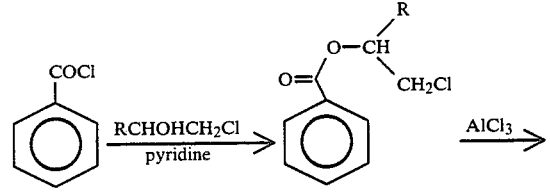

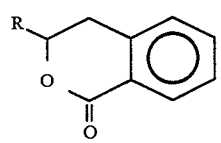

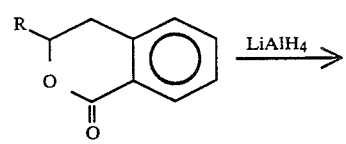

Several more useful routes to desired compounds utilize RCHBrCOOH, RCH(CH₂Br)COOH and RCH(CH₂CH₂Br)COOH. These are made from RCHO. The first step is homologization of the aldehyde (S. G. Levine, *J. Amer. Chem. Soc.* 80 6150 (1958):

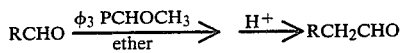

The α-bromoacid is made by oxidation (*Tetrahedron* 24 6583 (1968) and halogenation (*Organic Syntheses I*, 115).

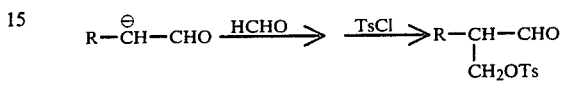

The other two bromoacids are made by the following routes:

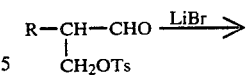

(Org. Syn. Coll. Vol. 3 44 (1955))

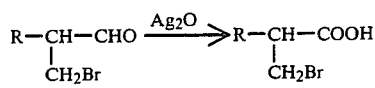

(S. E. Wentworth and P. L. Sciaraffa *Org. Prep. Proc.* 1 225 (1969))

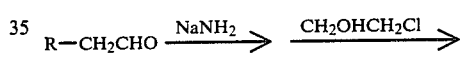

(G. Stork, P. A. Grieco and M. Gregson, *Tet. Let.* 1393 (1969))

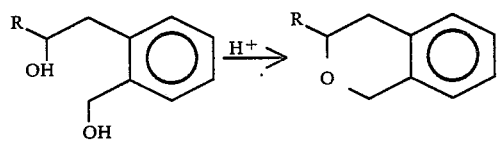

A number of desired compounds are obtained from the three classes of bromoacids. The general references for the procedures are already given above.

(L. F. Fieser and M. Fieser, *Reag. Org. Syn.* 1 1158–1159 (1967))

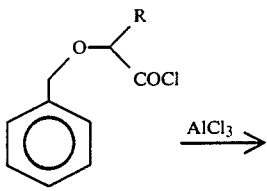
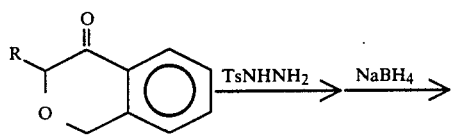
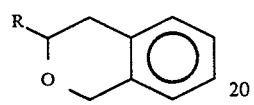
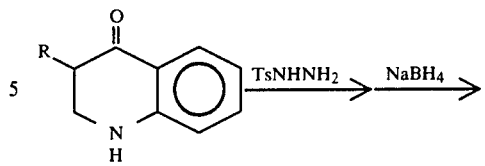
The acid chloride of the bromoacid provides six more useful classes of compounds
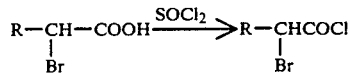
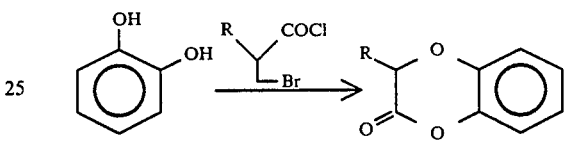
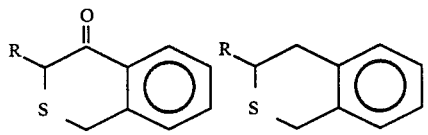
Similarly, starting with benzyl mercaptan the following are synthesized:
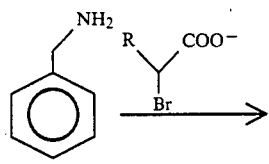
The nitrogen analogs must have the amino group protected before formation of the acid chloride (R. A. Boissonnas, *Adv. Org. Chem.* 3, 171 (1963)).
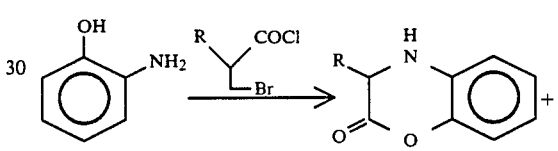
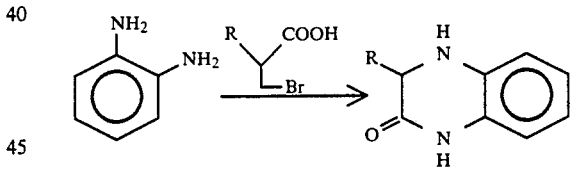
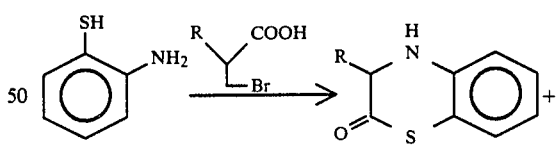
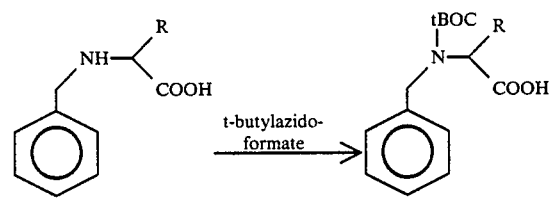
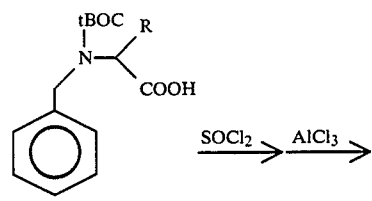
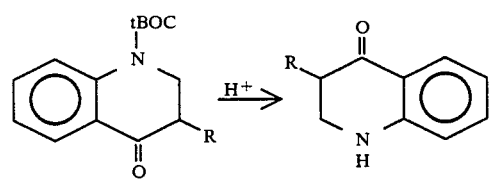
A similar series is synthesized from RCH(CH₂Br)COOH.
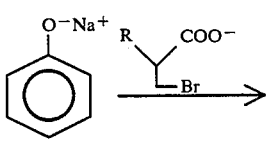

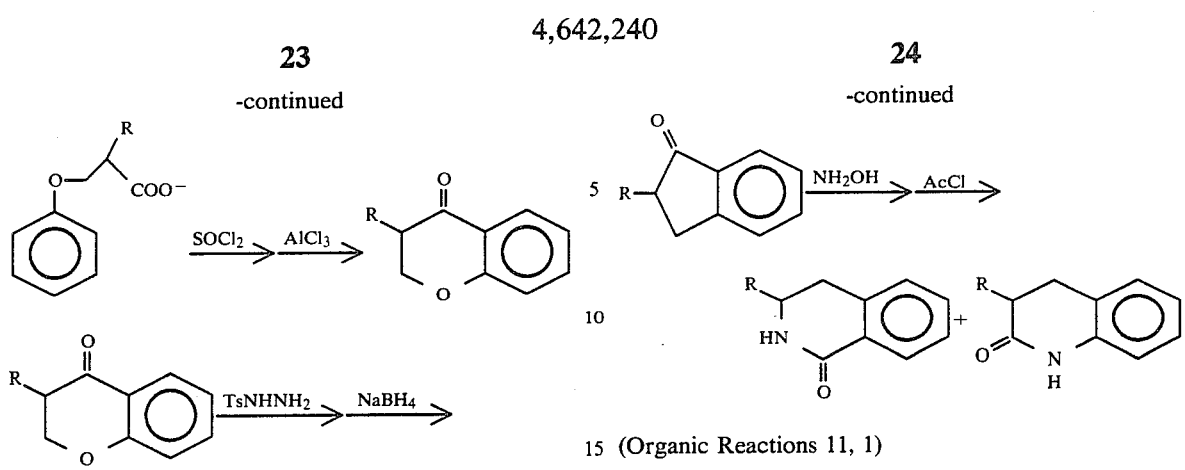

With benzenethiol and aniline the following series result:

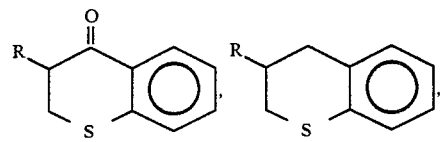

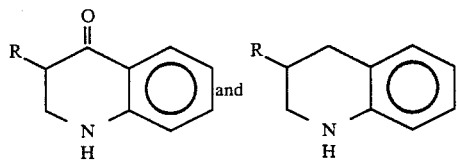

The acid chloride of RCH(CH₂Br)COOH provides routes to seven more desired classes.

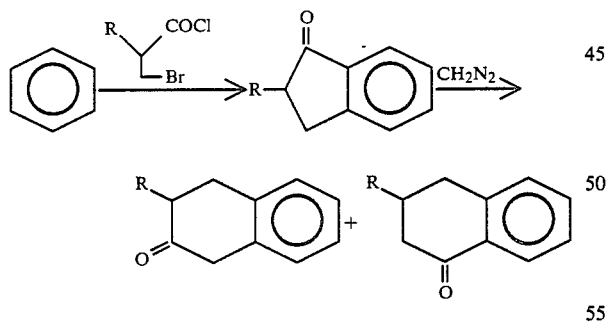

(Org. Syn. 34,24)

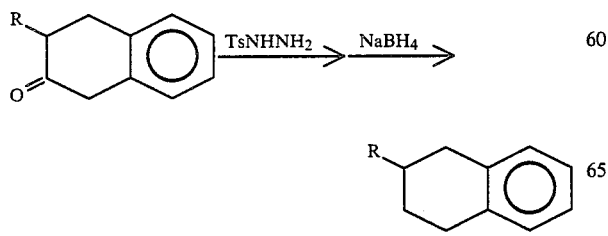

(Organic Reactions 11, 1)

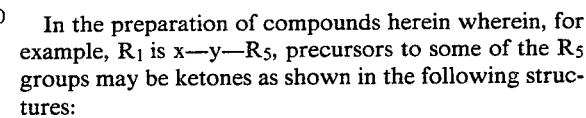

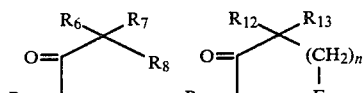

The acid chloride of RCH(CH₂CH₂Br)COOH provides an additional class via a Friedel Crafts reaction.

In the preparation of compounds herein wherein, for example, $R_1$ is x—y—$R_5$, precursors to some of the $R_5$ groups may be ketones as shown in the following structures:

The corresponding alcohols or amines may also be used as precursors. The alcohols are obtained by reduction of the ketones with lithium aluminum hydride, whereas the amines are prepared from the ketones by reductive amination employing formic acid and formamide (*Org. Reactions*, Wiley and Sons, New York, Vol. 5, p. 301, 1949).

Ketones of the above formulas, where $R_6$–$R_{20}$, n, and m are as defined above, are either commercially available or may be obtained by alkylation of the corresponding unsubstituted compounds. Alkylations are easily accomplished by using agents such as the appropriate alkyl sulfate or halide under alkaline conditions provided by strong bases, for example, sodium amide.

Alternately, ketones of type II and III may be prepared by cyclization of an acylic precursor. A common cyclization is the Dieckman synthesis, whereby dicarboxylic esters are hydrolyzed and decarboxylated. See *Modern Synthetic Reactions*, W. A. Benjamin, Menlo Park, CA 1972, p. 740. The alpha-keto esters produced, especially those with no other alpha-substituent, can also be alkylated prior to hydrolysis and decarboxylation, if desired.

For preparation of diketones II and III, wherein one of E and Q is C=O and the other is $CH_2$, the keto groups of an acylic keto dicarboxylate ester precursor is converted to a ketal or thioketal prior to the Dieckmann cyclization. Ester hydrolysis followed by decarboxylation yields a keto-ketal. The keto-ketal may then be alkylated with an alkyl halide or alkyl sulfate to produce $\alpha,\alpha'$-disubstituted keto-ketals that may be condensed with a Wittig reagent (see scheme below) and subsequently hydrogenated to form compounds such as IVa.

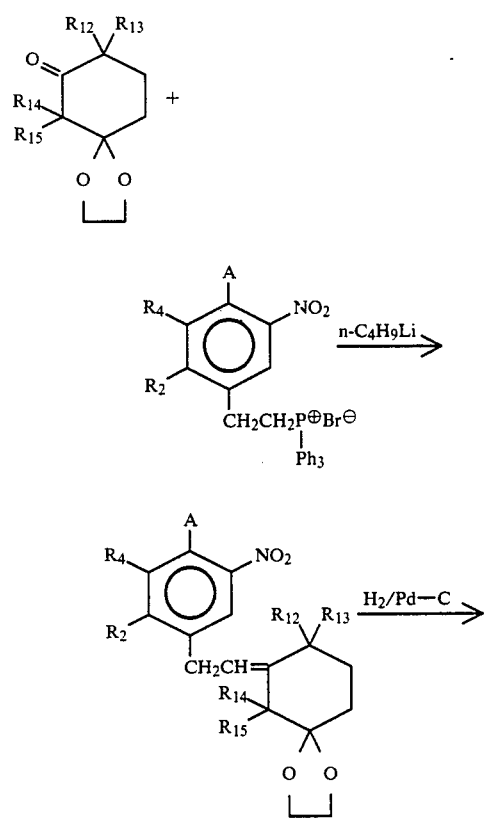

The corresponding five-membered ring ketones (II and III), wherein N=0 and m=1, are obtained when V is first reacted with formaldehyde to produce an intermediate α-hydroxymethyl compound which is then brominated at the $\alpha'$-position and cyclized with sodium hydroxide or hydrogen sulfide to provide the corresponding compounds of formula II and III wherein either Q or E is O n S and the other $CH_2$.

The tetrahydropyran-4-ones and tetrahydrothiopyran-4-ones of formulas II and III are obtained by adding the elements of water or hydrogen sulfide to the appropriately substituted divinyl ketone.

Ketone intermediates of type VI, wherein Q and E are C=O and O, respectively, are obtained by methods shown below where $R_{12}$–$R_{15}$ are as defined above.

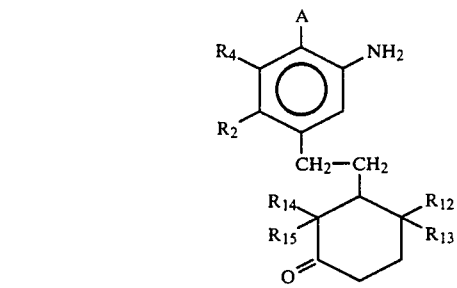

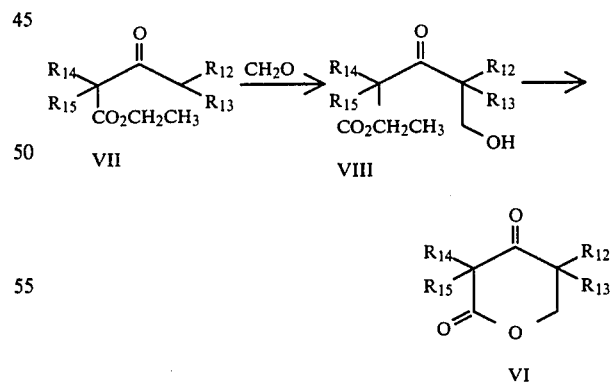

The appropriately substituted acetoacetic ester VII is reacted with formaldehyde, under basic conditions, and the resulting hydroxy alkylated intermediate VIII is then cyclized by heating in the presence of a weak acid or base with removal of ethanol.

Brominations of acetoacetic esters of formula VII and subsequent treatment of the product with e.g., sodium hydroxide, provides ketones of formula IX.

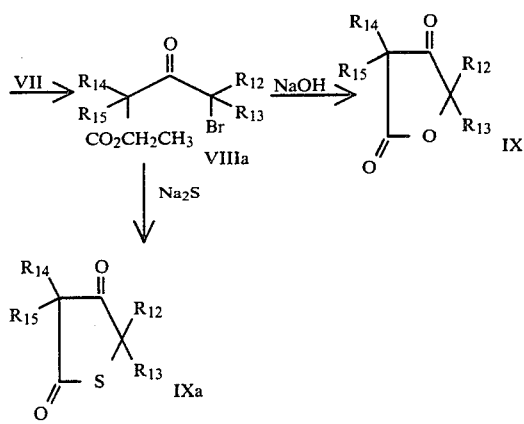

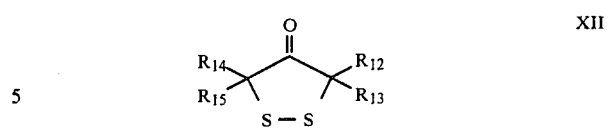

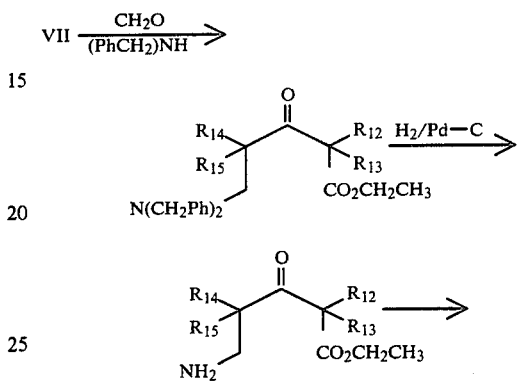

Thiolactones of type IXa are conveniently prepared by treating structures like VIIIa with sodium sulfide (see Fieser and Fieser, *Reagents for Organic Synthesis*, p. 1105, 1967).

Treatment of a monobromo derivative of ketones of formula V with ethyl malonate and subsequent hydrolysis, decarboxylation and esterification of the resulting product affords intermediates of formula X, which serve as precursors of the ketones XI below.

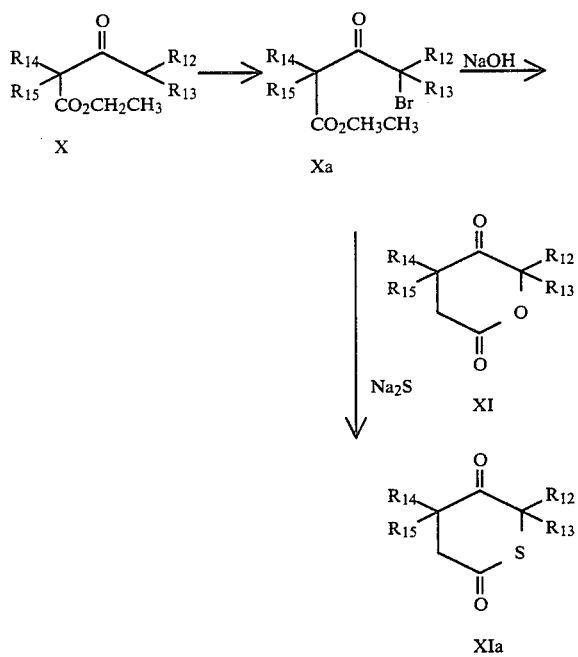

Lactones, wherein one of E and Q is C=O and the other is NH, may be prepared according to the following sequence:

Isomeric ketolactams are formed according to the following sequence:

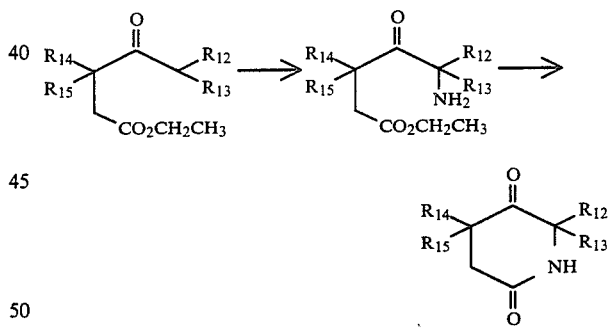

5-Membered lactams are also obtained according to the method found in U.S. Pat. No. 3,125,569.

The following description relates to synthetic routes to

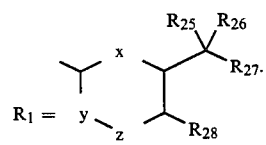

With the exception that Friedel-Crafts reactions cannot be used, the reactions are essentially as those described above. The starting point for these syntheses is the ketone The 1,2-dibromoketone derivatives of V, prepared by treating V with 2 moles of bromine, can also be converted to the corresponding 1,3-dimercaptoketone by reaction with at least two moles of sodium hydrosulfide. Treating the dimercaptoketone with hypochlorous acid, hydrogen peroxide or iodine will provide ketones of the following structure (XII), wherein E and Q are S.

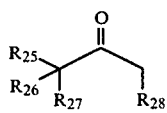

whose synthesis is covered hereinabove. For these syntheses that ketone must be converted to the enamine (G. Stark, A. Brizzolara, H. K. Landesman, J. Szmuszkovicz and R. Terrell *J. Amer. Chem. Soc.* 85, 207 (1963)).

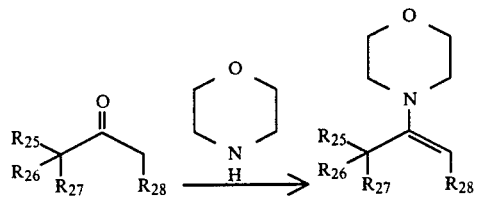

The enamine can be formylated or acetylated to give the corresponding compounds (W. R. N. Williamson, *Tetrahedran* 3 3,4 (1958); G. Stork, R. Terrell); and J. Szmuszkovicz *J. Amer. Chem. Soc.* 76 2029 (1954)).

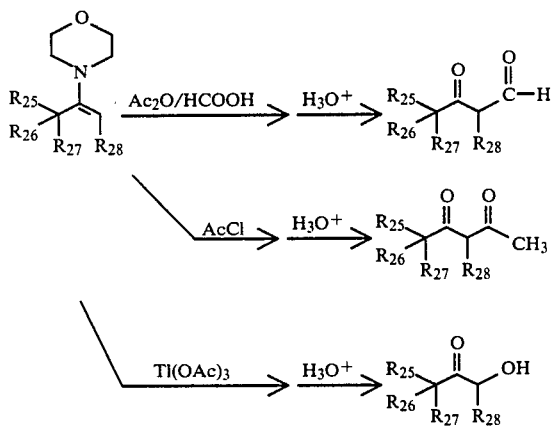

The enamine can also be hydroxylated (M. E. Kuehne and T. J. Giacobbe, *J. Org. Chem.* 33, 3359 (1968)). Because the aldehyde and methyl ketone carbonyls are less hindered than the other carbonyl, they can be selectively protected under mild conditions (H. O. House and G. H. Rasmusson *J. Org. Chem.* 28 27 (1963)).

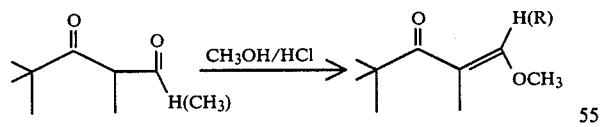

The enol ether ketone can be reduced directly or reductively aminated (R. F. Borch, *Org. Syn.* 52, 124(1972)).

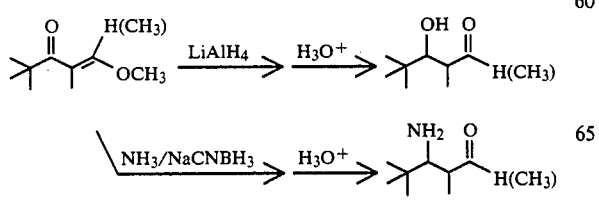

Reduction or reductive amination of the dicarbonyl, aminocarbonyl and hydroxycarbonyl compounds above provides the following structures or starting materials for synthesizing $R_1$ groupings analogous to those above

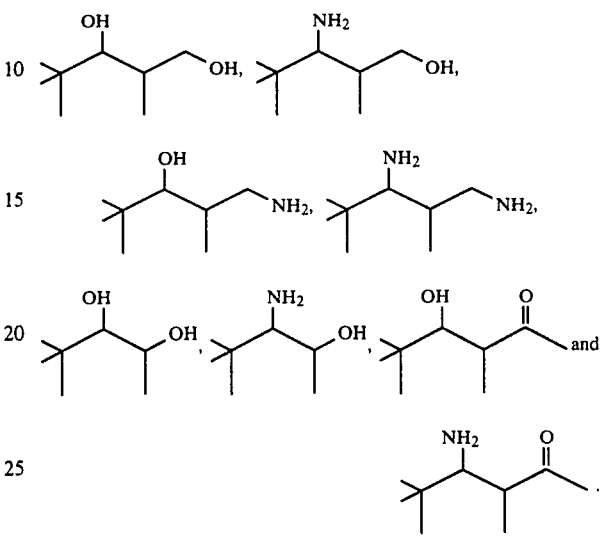

If the hydroxyl or amino groups of the methyl ketones are protected, the methyl ketone can be oxidized to the acid (R. C. Fuson and B. A. Bull, *Chem. Rev.* 15 275 (1934)).

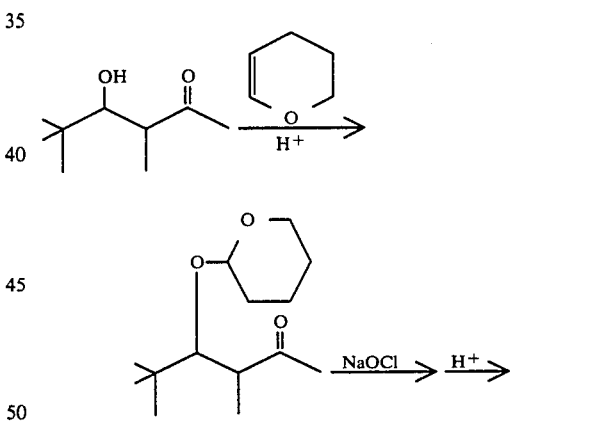

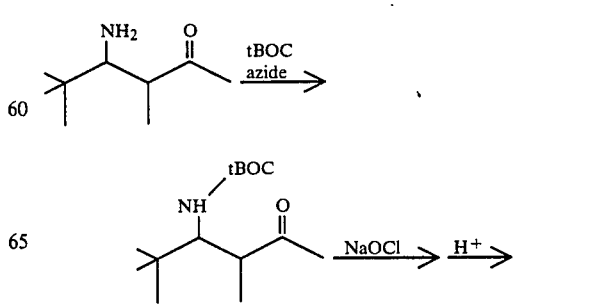

-continued

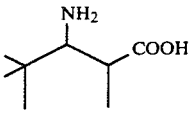

Synthetic routes to thiol-containing starting materials are available through the mono-carbonyl compounds described above (A. F. B. Cameron, J. S. Hunt, J. F. Oughton, P. A. Wilkinson and B. M. Wilson, *J. Chem. Soc.* 3864; (1953). R. Mayer and H. Berthold, *Chem. Ber.* 96, 3096 (1963)).

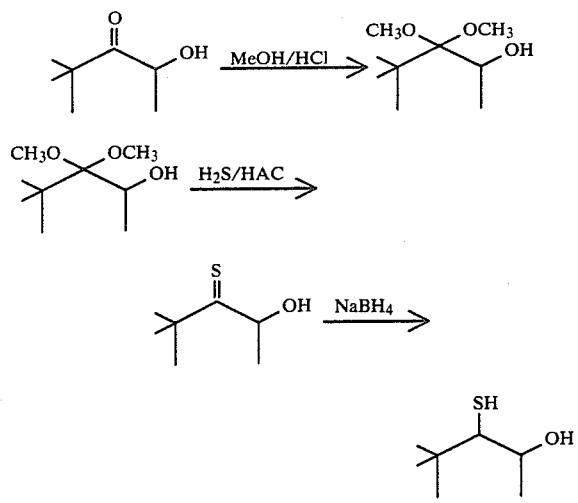

Similarly

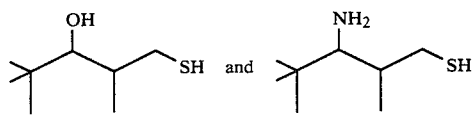

can be made.

Synthetic routes to

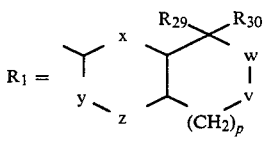

are the same as described above, with the starting ketone being

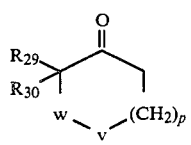

The synthesis of this ketone is described above.

In order that those skilled in the art may better understand how the present invention may be practiced, the following examples are given by way of illustration and not by way of limitation. Unless otherwise indicated, all solutions are aqueous.

EXAMPLE 1

The following table lists 36 sweetness modifying agents within the scope of the present invention. The compounds were tasted at several levels up to 50 millimolar (mM) in pH 7 adjusted solutions with and without 5% sucrose added. These solutions were then judged versus a stock 5% sucrose solution given an arbitrary rating of 100. The raw numbers were then analyzed to give an effectiveness rating. S indicates the compound is a sweetener and the subscript value is the concentration in millimolar (mM) needed to give a sweetness judgement equivalent to 5% sucrose. I indicates the test compound is an inhibitor and the subscript value is the concentration needed in mM to give a 50% reduction in the sweetness judgement of a 5% sucrose solution.

TABLE I

| No. | Compound Tested | Effectiveness |
|---|---|---|
| 1 | 2-amino-5-iodobenzoic acid | $S_{50}$ |
| 2 | 2-amino-5-methylbenzoic acid | $S_{33}$ |
| 3 | 2-amino-4-chlorobenzoic acid | $S_{11}$ |
| 4 | 2-amino-5-sulfobenzoic acid | $I_{<50}$ |
| 5 | 2-amino-4-methylbenzoic acid | $S_{50}$ |
| 6 | 2-amino-4-carboxybenzoic acid | $I_{<50}$ |
| 7 | 3-amino-4-hydroxybenzoic acid | $I_{25}$ |
| 8 | 3-amino-6-chlorobenzoic acid | $I_{28}$ |
| 9 | 3-amino-4-chlorobenzoic acid | $I_{28}$ |
| 10 | 3-amino-4-methoxybenzoic acid | $I_{27}$ |
| 11 | 3-amino-5-carboxybenzoic acid | $I_{26}$ |
| 12 | 3-amino-5-acetamidobenzoic acid | $I_{50}$ |
| 13 | 3-amino-4-methylbenzoic acid | *$I_{120}$ |
| 14 | 3,5-diaminobenzoic acid | $I_{50}$ |
| 15 | 3,4-diaminobenzoic acid | $I_{50}$ |
| 16 | 3,5-diamino-6-methylbenzoic acid | $I_{50}$ |
| 17 | 2-amino-5-methoxybenzenesulfonic acid | $I_{15}$ |
| 18 | 2-amino-5-methylbenzenesulfonic acid | $I_{14}$ |
| 19 | 2-amino-benzenesulfonic acid | *$I_{120}$ |
| 20 | 2-amino-1,4-benzenedisulfonic acid | $I_{30}$ |
| 21 | 3-amino-4-hydroxybenzenesulfonic acid | $I_{50}$ |
| 22 | 3-amino-4-ethylbenzenesulfonic acid | $I_{14}$ |
| 23 | 3-aminobenzenesulfonic acid | $I_{30}$ |
| 24 | 3-amino-4-n-butylbenzenesulfonic acid | $I_{5}$ |
| 25 | 3-amino-4-n-pentylbenzenesulfonic acid | $I_{6}$ |
| 26 | 3-amino-5-chloro-6-methylbenzenesulfonic acid | $I_{10}$ |
| 27 | 3-amino-4-methyl-5-chlorobenzenesulfonic acid | $I_{10}$ |
| 28 | 3-amino-4-chlorobenzenesulfonic acid | $I_{16}$ |
| 29 | 3-amino-benzeneboronic acid | $I_{<50}$ |
| 30 | 2-amino-5-chlorobenzoic acid | $S_{10}$ |
| 31 | 3-amino-5-carboxybenzenesulfonic acid | $I_{50}$ |
| 32 | 3-amino-6-chlorobenzenesulfonic acid | $I_{5}$ |
| 33 | 2,4-diaminobenzenesulfonic acid | $I_{50}$ |
| 34 | 3-amino-5-benzylaminobenzoic acid | $I_{<4}$ |
| 35 | 3-amino-5-cyclohexylmethylaminobenzoic acid | $I_{<4}$ |
| 36 | 3-amino-5-furfurylaminobenzoic acid | $I_{<4}$ |

*tested at 120 mM.

EXAMPLE 2

Compounds were tested at a level of 0.2% in pH 3 citrate buffer (6.65 g citric acid/0.719 g tripotassium citrate) containing 5% sucrose. These test solutions were then judged in a paired comparison versus a standard 5% sucrose solution in the same buffer given an arbitrary sweetness rating of 100. Numbers less than 100 indicate the test compound inhibits sweetness perception while those above 100 indicate the test compound is a sweetener. Asterisks indicate actual test concentrations were less than 0.2% because of solubility difficulties.

TABLE II

| No. | Compound Tested | Sweetness Rating |
|---|---|---|
| 1 | 3-amino-6-hydroxybenzoic acid | *72 ± 4 |
| 2 | 3-amino-6-chlorobenzoic acid | *40 ± 14 |
| 3 | 3-amino-4-methoxybenzoic acid | *79 ± 2 |
| 4 | 3-amino-5-acetamidobenzoic acid | 50 ± 0 |
| 5 | 3-amino-4-methylbenzoic acid | 170 ± 28 |
| 6 | 3,5-diaminobenzoic acid | 67 ± 18 |
| 7 | 3,4-diaminobenzoic acid | 80 ± 0 |
| 8 | 2-amino-5-methoxybenzenesulfonic acid | 45 ± 7 |
| 9 | 2-amino-5-methylbenzenesulfonic acid | 80 ± 0 |
| 10 | 3-amino-6-methylbenzenesulfonic acid | 60 ± 14 |
| 11 | 3-amino-benzenesulfonic acid | 50 ± 5 |

EXAMPLE 3

Varying levels of a sweetness modifier comprising aminobenzenesulfonic acid with various substituents were added to a solution at a pH of 7 containing 5% by weight sucrose. The sweetness perception was measured by a panel of experts, with 100 indicating the sweetness of a 5% solution of sucrose and 0 indicating no sweetness.

| Concentration of modifier (% by weight of solution) | Sweetness Rating | | |
|---|---|---|---|
| | 3-amino-benzene-sulfonic acid | 3-amino-4-chlorobenzene-sulfonic acid | 2-amino-benzene-sulfonic acid |
| 0 | 100 | 100 | 100 |
| 0.14 | 90 | 60 | 120 |
| 0.5 | 35 | 10 | 110 |
| 2.0 | 10 | 3 | 30 |

The above table shows that the aminobenzenesulfonic acids effectively inhibited the sweetness perceived from a sucrose solution.

Metanilic acid (3-aminobenzenesulfonic acid) at varying levels was added to a reconstituted sweetened orange flavored beverage (Tang TM Instant Beverage Mix, 100 gms of mix per liter) at a pH of about 3.5. Sweetness perception was measured by a panel of experts with the following evaluations (wherein 100 indicates the sweetness of the solution without the addition of metanilic acid and 0 indicating no sweetness):

| Concentration of metanilic acid (% by weight of solution) | Sweetness Rating |
|---|---|
| 0.000 | 100 |
| 0.082 | 100 |
| 0.34 | 60 |
| 1.37 | 4 |

The above table shows that metanilic acid effectively inhibited the sweetness perceived in an orange flavored beverage.

Metanilic acid was when combined at varying levels with 0.0025% by weight of neohesperidin dihydrochalcone and evaluated by a panel of experts with the following results observed (wherein 100 is the sweetness 0.0025% solution of neohespiridin dihydrochalcone (judged equal to 5% sucrose) and 0 indicates no sweetness):

| Concentration of metanilic acid (% by weight of solution) | Sweetness Rating |
|---|---|
| 0.000 | 100 |
| 0.50 | 50 |
| 1.00 | 40 |
| 2.00 | 10 |

The above table shows that metanilic acid acted as an effective sweetness inhibitor of the sweet taste perceived from dihydrochalcone. However, upon rinsing the mouth with water the sweet aftertaste of dihydrochalcone returned showing the reverseability of the sweetness inhibition.

EXAMPLE 4

The Effect of Sweetness Inhibitors on TANG TM Beverage

The following compounds were added to TANG TM orange flavored beverage and the product adjusted to the original TANG TM beverage pH using sodium hydroxide. To correct for any diminished sweetness due to increased sourness, a TANG TM orange flavored beverage standard to which 0.3% citric acid was added was prepared. This standard was rated by a trained panel to have a greater sourness than any of the compounds tested at 1%. The sweetness of TANG TM orange flavored beverage itself was rated as 100.

| COMPOUND | Sweetness Rating Concentration | |
|---|---|---|
| | 0.5% | 1% |
| Citric Acid | 80 (0.3%) | |
| 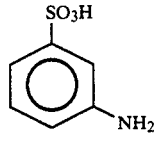 | 33 | 7 |
| 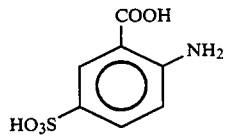 | 33 | 2 |
| 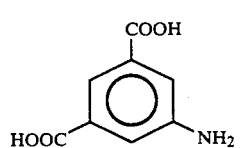 | 58 | 40 |
| 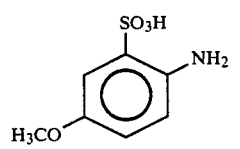 | 27 | 5 |

-continued

| COMPOUND | Sweetness Rating Concentration | |
|---|---|---|
| | 0.5% | 1% |
| 2,5-diaminobenzenedisulfonic acid (SO₃H, NH₂, SO₃H on benzene) | 70 | 23 |

EXAMPLE 5

The Effect of Sweetness Inhibitors at pH 7

The following compounds were tasted in pH 7 buffer (3.5 g tripotassium citrate and 0.042 g. citric acid per liter) with 15% sucrose. Sweetness levels were determined by comparison with sucrose standards of 2%, 5%, 7%, 10%, 12% and 15% sucrose in the pH 7 buffer, and the perceived sweetness rated in terms of % sucrose equivalence.

| 1. CONCENTRATION OF COMPOUND (%) | % Sucrose Equivalent Sweetness COMPOUND | | |
|---|---|---|---|
| | SO₃H-C₆H₄-NH₂ | COOH-C₆H₃(SO₃H)-NH₂ | SO₃H-C₆H₃(NH₂)-SO₃H |
| 0.5 | 11.5 | 13.0 | 13.7 |
| 1.0 | 9.2 | 10.7 | 12.7 |
| 2.0 | 4.2 | 8.3 | 13.0 |
| 3.0 | 1.5 | 4.2 | 10.0 |
| 5.0 | 0.0 | 1.7 | 6.7 |

% Sucrose Equivalent Sweetness

| 2. CONCENTRATION OF COMPOUND (%) | Compound | |
|---|---|---|
| | COOH-C₆H₃(COOH)-NH₂ (HOOC, NH₂) | COOH-C₆H₃(Cl)-NH₂ |
| 0.05 | 15.0 | 13.5 |
| 0.1 | 13.0 | 12.5 |
| 0.3 | 12.5 | 10.0 |
| 1.0 | 9.0 | 6.5 |
| 2.0 | 7.5 | 2.5 |

| | % Sucrose Equivalent Sweetness Compound |
|---|---|
| | SO₃H-C₆H₃(NH₂)-CH₂CH₂CH₂CH₃ |
| 0.02 | 15.0 |
| 0.05 | 14.2 |
| 0.1 | 12.0 |
| 0.2 | 10.5 |
| 0.3 | 8.8 |
| 0.5 | 6.5 |

EXAMPLE 6

The inhibitors were made up in solutions containing either 100 mg% APM or 50 mg% saccharin in citrate buffer, pH 7. These sweetener levels are approximately equal to 15% sucrose in sweetness. Sweetness levels were determined by comparison with sweetener standards made up in citrate buffer, pH 7.

APM Standards: 13, 33, 47, 67, 80 and 100 mg% APM.

Saccharin Standards: 17, 23, 33, 40, 50 and 67 mg% Saccharin.

The perceived sweetness was rated in terms of mg% sweetener equivalence.

| Compound | mg % APM Equivalent Sweetness | | | |
|---|---|---|---|---|
| | SO₃H-C₆H₄-NH₂ | COOH-C₆H₄-NH₂ (HOOC, NH₂ meta) | COOH-C₆H₄-NH₂ (H₃OS) | SO₃H-C₆H₃(NH₂)-SO₃H |
| 0.1 | 61 ± 25 | 93 ± 11 | 97 ± 6 | 97 ± 6 |
| 0.2 | 50 ± 17 | 76 ± 8 | 69 ± 19 | 79 ± 12 |
| 1.0 | 34 ± 12 | 65 ± 17 | 47 ± 33 | 67 ± 18 |
| 2.0 | 13 ± 0 | 23 ± 14 | 33 ± 33 | 49 ± 23 |

| % Compound | mg % Saccharin Sweetness | | | |
|---|---|---|---|---|
| 0.1 | 56 ± 14 | 61 ± 10 | 61 ± 10 | 56 ± 10 |
| 0.2 | 47 ± 18 | 41 ± 8 | 40 ± 0 | 43 ± 12 |
| 1.0 | 32 ± 8 | 23 ± 0 | 24 ± 8 | 43 ± 10 |
| 2.0 | 6 ± 10 | 6 ± 10 | 11 ± 10 | 28 ± 9 |

| Compound | Level (%) to give 50% Inhibition | | |
|---|---|---|---|
| | APM* | Saccharin* | 15% Sucrose |
| SO₃H-C₆H₄-NH₂ (meta) | 0.20 | 1.3 | 1.2 |

-continued

| Compound | | | |
|---|---|---|---|
| 3-amino-5-carboxybenzoic acid (COOH, HOOC, NH2) | 1.4 | 0.91 | 1.6 |
| 2-amino-5-sulfobenzoic acid (COOH, NH2, H3OS) | 0.89 | 0.95 | 2.1 |
| 2-amino-1,4-benzenedisulfonic acid (SO3H, NH2, SO3H) | 1.9 | 2.5 | 4.9 |

*concentration iso-sweet to 15% sucrose

EXAMPLE 7

The following compounds were tasted at pH 7 in citrate buffer (3.5 g $K_3$ citrate and 0.042 g. citric acid per liter) with and without 5% sucrose. Sweetness was rated using 5% sucrose as 100%. The compounds by themselves are not sweet.

| Compound | Sweetness Rating 0.5% | 1% |
|---|---|---|
| COOH, NH2, HO3S (2-amino-5-sulfobenzoic acid) | 60.6 ± 28.3 | 30.6 ± 30.3 |
| COOH, HOOC, NH2 (3-amino-5-carboxybenzoic acid) | 57.5 ± 29.9 | 25.0 ± 20.4 |
| SO3H, NH2, H3CO (2-amino-5-methoxybenzenesulfonic acid) | 18.8 ± 15.3 | 5.0 ± 10.0 |
| SO3H, NH2, SO3H (2-amino-1,4-benzenedisulfonic acid) | 80.6 ± 17.4 | 59.4 ± 34.8 |

EXAMPLE 8

3-aminobenzenesulfonic acid (metanilic acid) was tasted in pH 7 buffer (3.5 g. $K_3$ citrate, 0.042 g. citric acid) with 15% and 20% sucrose. The standards were 5%, 10%, 15%, and 20% sucrose.

| CONCENTRATION (metanilic acid) | SWEETNESS RATING | |
|---|---|---|
| | 15% SUCROSE | 20% SUCROSE |
| 0.5% | 11.50 ± 1.22 | 15.50 ± 2.34 |
| 1% | 9.25 ± 1.50 | 12.00 ± 0.71 |
| 2% | 4.25 ± 2.25 | 7.00 ± 2.45 |
| 3% | 1.50 ± 2.38 | 3.13 ± 3.06 |
| 5% | 0.00 ± 0.00 | 1.25 ± 2.50 |

EXAMPLE 9

Sweetness Inhibition in the Presence of Bitterness 3-amino-4-chlorobenzoic acid is reported in the literature to be a bitter compound. Since it is well known that bitterness supresses sweetness perception, it is important to know whether the bitterness of 3-amino-4-chlorobenzoic acid is sufficient to account for the observed reduction in sweetness perception produced by the compound. A trained panel matched the bitterness of a 2% solution of 3-amino-4-chlorobenzoic acid adjusted to pH 7 with urea, a known bittering agent (a 2% solution of 3-amino-4-chlorobenzoic acid adjusted to pH 7 with urea is equivalent in bitterness to a 0.5% urea solution).

| Test Solution | % Sucrose Equivalent Sweetness |
|---|---|
| 2% 3-amino-4-chlorobenzoic acid (COOH, NH2, Cl) plus 15% sucrose | 7.0 |
| 0.5% Urea plus 15% Sucrose | 13.8 |

Thus, the bitterness equivalent to 2% 3-amino-4-chlorobenzoic acid reduced the perceived sweetness from 15% sucrose equivalence to 13.8% sucrose equivalence, 3-amino-4-chlorobenzoic acid reduced the sweetness to 7.0% sucrose equivalence. Therefore, 85% of the sweetness reduction produced by 3-amino-4-chlorobenzoic acid cannot be attributed to its bitterness, but must be due to some other unique character of the molecule.

EXAMPLE 10

Preparation of 2-amino-5-sulfobenzoic Acid

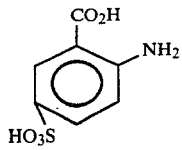

Anthranilic acid is heated with concentrated sulfuric acid to 180° C. for 1 hour, after which the acid is neutralized with sodium carbonate solution. Evaporation of the water yields the disodium salt of the title compound. Structural verification was obtained by carbon magnetic resonance, proton magnetic resonance and infrared analysis.

EXAMPLE 11

Preparation of 3-amino-4-hydroxybenesulfonic Acid

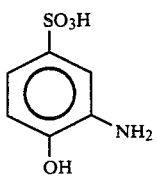

o-Nitroanisole is heated to 180° C. with concentrated sulfuric acid for 1 hour, neutralized with aqueous sodium carbonate. Evaporation of the solvent yields the sodium salt of 4-hydroxy-3-nitrobenzenesulfonic acid. Hydrogenation of this compound in 50% ethanol/water over palladium on charcoal yields the title compound after filtration and solvent removal. Structural verification was obtained by carbon magnetic resonance, proton magnetic resonance and infra-red analysis.

EXAMPLE 12

Preparation of 3-amino-4-ethylbenzenesulfonic Acid

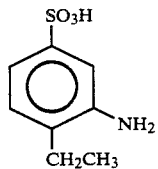

Ethylbenzene is sulfonated, as in previous reactions, to yield 4-ethylbenzenesulfonic acid. This is nitrated in a mixture of concentrated nitric acid/sulfuric acid to give 4-ethyl-3-nitrobenzenesulfonic acid. Reduction of the nitro group in 50% ethanol/water yielded the title compound. Again, the catalyst was palladium on charcoal during the hydrogenation. Structural verification was obtained by carbon magnetic resonance, proton magnetic resonance and infra-red analysis.

EXAMPLE 13

Preparation of 3-amino-4-n-butylbenzenesulfonic Acid

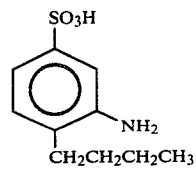

4-n-butylbenzenesulfonic acid is prepared by sulfonating 4n-butylbenzene with concentrated sulfuric acid at 180° C. as in previous reactions. Nitration of this compound with a mixture of sulfuric acid and nitric acid on a steam bath yielded 3-nitro-4-n-butylbenzenesulfonic acid. Hydrogenation of this in 50% ethanol/water over palladium on charcoal afforded 3-amino-4-n-butylbenzenesulfonic acid. Structural verification was obtained by carbon magnetic resonance, proton magnetic resonance and infra-red analysis.

EXAMPLE 14

Preparation of 3-amino-4-n-pentylbenzenesulfonic Acid

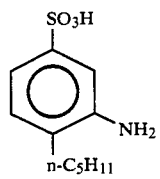

This compound was prepared from 4-n-pentylbenzene according to the procedure for the compound in Example 13 above. Structural verification was obtained by carbon magnetic resonance, proton magnetic resonance and infra-red analysis.

EXAMPLE 15

Preparation of 3-amino-5-carboxybenzenesulfonic Acid

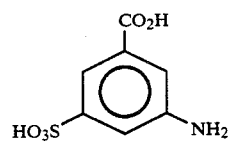

Benzoic acid was sulfonated by heating it with concentrated sulfuric acid in the presence of sulfur trioxide. The 3-sulfobenzoic acid was nitrated with fuming nitric acid to yield 3-nitro-5-sulfobenzoic acid. Hydrogenation of this in 50% ethanol/water over palladium on charcoal easily afforded 3-amino-5-sulfobenzoic acid in good yield. Structural verification was obtained by carbon magnetic resonance, proton magnetic resonance and infra-red analysis.

EXAMPLE 16

Preparation of Aminoterephthalic Acid

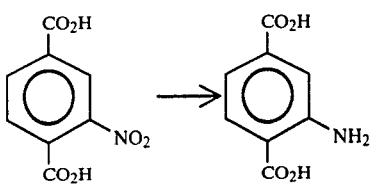

Nitroterephthalic acid (5 g., 0.0237 mol) in acetic acid (300 ml) was hydrogenated at 50 psi in a Parr bottle at room temperature with palladium on carbon (10% load, 1 g.) used as the catalyst. After shaking under 50 psi of $H_2$ gas for 0.5 H., the solution was evacuated of pyrophoric gases and filtered through a bed of celite. The filtrate was concentrated to yield on orange solid (4 g.) which was recrystallized with methanol and diethyl ether. The recrystallized solid was chromatographed on silica gel with a solvent system (10:3:1 ethyl acetate/ethanol/water) to provide 2.5 g. (60%) of pure aminoterephthalic acid as a yellow solid. Structural verification was obtained by carbon magnetic resonance, proton magnetic resonance and infra-red analysis.

EXAMPLE 17

Preparation of 3-amino-5-benzylaminobenzoic Acid

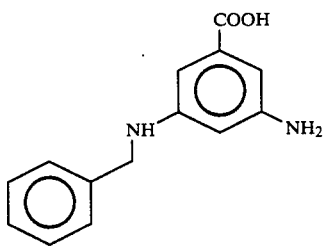

15.2 g. (0.1 mol) of 3,5-diaminobenzoic acid was placed in a 500 ml. round bottom flask to which 200 ml of methanol was added. To the round bottom flask 10.3 g. (0.1 mol) of benzaldehyde was added. The solution was stirred for several minutes. While the solution stirred 3.77 g. (0.06 mol) sodium cyanoborohydride was added slowly. After 5 hours the solution was filtered and then concentrated to dryness. The reaction mixture was dissolved in 200 ml. of 2M hydrochloric acid. The acid solution was extracted twice with 200 ml. ethyl acetate. The ethyl acetate solutions were combined and back washed with 200 ml. distilled water, and then dried over sodium sulfate. The solution was concentrated to dryness and 4.58 gm. of product was collected. The product was then purified by column chromatography using a solution of tetrahydrofuran/ethanol/water/ammonium hydroxide in the following ratio—10:3:1:0.04 as the eluent. Structural verification was obtained by carbon magnetic resonance, proton magnetic resonance and infra-red analysis.

EXAMPLE 18

Preparation of 3-amino-5-(N-cyclohexylmethylamino)benzoic Acid

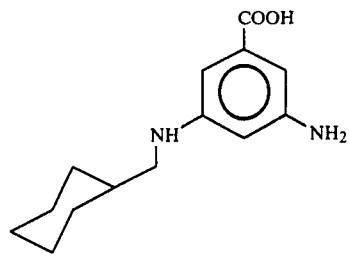

15.2 g. (0.1 mol) of 3,5-diaminobenzoic acid was placed in a 500 ml. round bottom flask to which 200 ml. of methanol was added. To the round bottom flask 11.22 g. (0.1 mol) of cyclohexane carboxyaldehyde was added. The solution was stirred for several minutes. While the solution stirred, 3.77 g. (0.06 mol) sodium cyanoborohydride was added slowly. After 5 hours the solution was filtered and then concentrated to dryness. The reaction mixture was dissolved in 200 ml. of 2M hydrochloric acid. The acid solution was extracted twice with 200 ml. ethyl acetate. The ethyl acetate solutions were combined and back washed with 200 ml. distilled water, and then dried over sodium sulfate. The solution was concentrated to dryness and 4.18 gm. of product was collected. The product was then purified by column chromatography using a solution of tetrahydrofuran/ethanol/water/ammonium hydroxide in the following ratio—10:3:1:0.04 as the eluent. Structural verification was obtained by carbon magnetic resonance, proton magnetic resonance and infra-red analysis.

EXAMPLE 19

Preparation of 3-amino-5-(N-furfurylamino)benzoic Acid

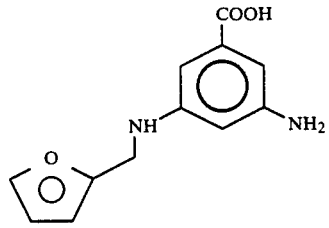

This compound was prepared from 3,5-diaminobenzoic acid and 2-furfuraldehyde according to the procedure of Example 18.

Obviously, other modifications and variations of the present invention are possible in the light of the above teachings. It is, therefore, to be understood that changes may be made in the particular embodiments of this invention which are within the full intended scope of the invention was defined by the appended claims.

EXAMPLE 20

The Effect of 3-aminobenzenesulfonic Acid on Sucrose

Four solutions of sucrose (0%, 5%, 10% and 15%) were factorially combined with four solutions of 3-aminobenzenesulfonic acid (0%, 0.5%, 1.0% and 2.0%). The following amounts of 1N NaOH were added to the mixtures to bring them to pH 7: 26.5 ml (to 0.5%), 66.2 ml (to 1%), and 109.5 ml (to 2%).

The four solutions of sucrose were also factorially combined with four solutions of a control mixture. The levels of the control mixture—obtained through preliminary testing—were intended to match the sweet, sour, salty, and bitter tastes of the 3-aminobenzenesulfonic acid solutions at the aforementioned levels. The composition of this mixture was citric acid and buffer. The amount of citric acid (and their respective 3-aminobenzenesulfonic acid matches) were: 0.063% (for 0.5% 3-aminobenzenesulfonic acid), 0.125% (for 1% 3-aminobenzenesulfonic acid), and 0.25% (for 2% 3-aminobenzenesulfonic acid). Thus, for each level of 3-aminobenzenesulfonic acid), one eighth the concentration of citric acid was used as a taste match. As a match for 0% only the buffer was used. The amounts of 1N NaOH required to bring these mixtures to pH 7 were 8.7 ml (for 0.063%), 17.5 ml (for 0.125%), and 35.2 ml (for 0.25%).

The 32 test solutions were scaled for sweetness, sourness, saltiness, and bitterness by 14 subjects using a double-blind procedure. Each subject rated the entire set of solutions in a single session using a sip and spit procedure. The data were analyzed by analyses of variance and covariance. The results are tabulated below:

| Conc. 3-aminobenzene-sulfonic acid | Conc. Sucrose % | | |
|---|---|---|---|
| | 4.95% | 9.9% | 14.85% |
| | Mean Judgement Sweetness | | |
| 0% | 2.0 | 4.1 | 4.6 |
| 0.5% | 1.1 | 3.0 | 4.6 |
| 1% | 0.4 | 2.0 | 3.4 |
| 2% | 0.1 | 0.5 | 1.5 |

The results of the above-testing showed that 3-aminobenzenesulfonic acid decreases the sweetness of sucrose in solution at pH 7 and also that the effect is not attributable to the masking of sweetness by the nonsweet taste of 3-aminobenzenesulfonic acid.

Obviously, other modifications and variations of the present invention are possible in the light of the above teachings. It is, therefore, to be understood that changes may be made in the particular embodiments of this invention which are within the full intended scope of the invention as defined by the appended claims.

We claim:

1. A composition comprising a foodstuff containing a sweetener preparation and, as a sweetener inhibitor, within the range of about 0.001 to about 2.0 weight percent based on the total composition, 3-aminobenzenesulfonic acid.

2. The composition of claim 1 wherein said sweetener is selected from the group consisting of a natural sweetener, an artificial sweetener and mixtures thereof.

3. The composition of claim 2 wherein said sweetener is selected from the group consisting of sucrose, fructose, corn syrup solids, dextrose, xylitol, sorbitol, mannitol, acesulfam, thaumatin, invert sugar, saccharin, saccharin salts, cyclamate, dihydrochalcone, aspartame, stevioside, glycyrrhizin, mixtures thereof and salts thereof.

4. The composition of claim 1 which comprises a foodstuff selected from the group consisting of beverages, sauces, desserts, confections, intermediate moisture foods and infused foods.

5. The composition of claim 1 wherein said sweetener inhibitor is present in said composition in an amount in the range of from about 0.1 to about 1% by weight of the composition.

6. The composition of claim 1 wherein said sweetener inhibitor is present in said composition in an amount in the range of from about 0.1 to about 0.5% by weight of the composition.

* * * * *